United States Patent
Hojo et al.

(10) Patent No.: US 7,420,005 B2
(45) Date of Patent: Sep. 2, 2008

(54) PHOTOCURABLE RESIN COMPOSITION, FINELY EMBOSSED PATTERN-FORMING SHEET, FINELY EMBOSSED TRANSFER SHEET, OPTICAL ARTICLE, STAMPER AND METHOD OF FORMING FINELY EMBOSSED PATTERN

(75) Inventors: Mikiko Hojo, Tokyo (JP); Toshio Yoshihara, Tokyo (JP)

(73) Assignee: Dai Nippon Printing Co., Ltd., Tokyo-to (JP)

( * ) Notice: Subject to any disclaimer, the term of this patent is extended or adjusted under 35 U.S.C. 154(b) by 160 days.

(21) Appl. No.: 10/178,189

(22) Filed: Jun. 24, 2002

(65) Prior Publication Data

US 2003/0129385 A1 Jul. 10, 2003

(30) Foreign Application Priority Data

| Jun. 28, 2001 | (JP) | ............................. 2001-197412 |
| Sep. 14, 2001 | (JP) | ............................. 2001-280545 |
| Sep. 14, 2001 | (JP) | ............................. 2001-280546 |

(51) Int. Cl.
C08F 2/46 (2006.01)
C08K 3/00 (2006.01)
C08K 3/18 (2006.01)
C08F 2/50 (2006.01)

(52) U.S. Cl. ............................. 522/81; 522/90; 522/96; 522/104; 522/107; 522/182; 522/74; 522/77; 522/79; 522/83; 522/84; 522/85; 522/86; 524/1; 524/3; 524/4; 524/5; 524/8; 524/80; 524/401; 524/413; 524/430; 524/437; 524/434; 524/442

(58) Field of Classification Search ............. 522/90, 522/96, 104, 182, 107, 74, 77, 79, 81, 83, 522/84, 85, 86, 71, 173, 174, 178; 524/1, 524/3, 4, 5, 680, 401, 430, 434, 437, 442
See application file for complete search history.

(56) References Cited

U.S. PATENT DOCUMENTS

| 4,576,850 | A |   | 3/1986  | Martens |             |
| 5,169,704 | A | * | 12/1992 | Faust et al. | 428/143 |
| 5,246,765 | A | * | 9/1993  | Lussi et al. | 428/203 |
| 5,260,118 | A | * | 11/1993 | Lussi et al. | 428/203 |
| 5,290,591 | A | * | 3/1994  | Lussi et al. | 427/202 |
| 5,378,735 | A | * | 1/1995  | Hosokawa et al. | 522/79 |
| 5,565,501 | A | * | 10/1996 | Hosokawa et al. | 522/83 |
| 6,355,703 | B1 | * | 3/2002 | Baba et al. | 522/182 |
| 6,730,388 | B2 | * | 5/2004 | MacQueen et al. | 428/141 |
| 6,790,512 | B2 | * | 9/2004 | MacQueen et al. | 428/147 |
| 6,791,649 | B1 | * | 9/2004 | Nakamura et al. | 349/137 |
| 6,917,400 | B2 | * | 7/2005 | Nakamura et al. | 349/96 |
| 6,919,504 | B2 | * | 7/2005 | McCutcheon et al. | 174/16.3 |
| 6,991,750 | B2 | * | 1/2006 | Majumdar et al. | 252/500 |
| 7,072,095 | B2 | * | 7/2006 | Liang et al. | 359/296 |
| 7,195,872 | B2 | * | 3/2007 | Agrawal et al. | 435/6 |
| 7,201,949 | B2 | * | 4/2007 | Houghtaling et al. | 428/1.1 |

FOREIGN PATENT DOCUMENTS

| JP | 60-254174   | 12/1985 |
| JP | 4-5681      | 2/1992  |
| JP | 05-046063   | 2/1993  |
| JP | 2000-063459 | 2/2000  |
| JP | 3802048     | 7/2006  |

* cited by examiner

Primary Examiner—Sanza L McClendon
(74) Attorney, Agent, or Firm—Ladas & Parry LLP

(57) ABSTRACT

The photocurable resin composition in the first aspect of the invention comprises, as essential components, (A) a binder resin having photopolymerizable functional groups and (B) inorganic superfine particles in the order of sub-micron which can be dispersed in a colloidal form; the photocurable resin composition in the second aspect comprises, as essential components, (C) a binder resin containing photopolymerizable functional groups and (D) hydrophobic fine silica particles; and the photocurable resin composition in the third aspect comprises, as essential components, (E) a binder resin containing acrylic resin and urethane acrylate resin and/or polyester acrylate having photopolymerizable functional groups and (F) an organometallic coupling agent. These photocurable resin compositions are excellent not only in fitting to the shape of a cavity in a stamper complementary to a finely embossed pattern on an optical article, thus enabling rapidly and accurately shaping a finely embossed pattern, but also in form retention after shaping and resistance to blocking, thus enabling exposure to light after removal of the stamper and storage in a rolled form to achieve excellent successive producibility.

7 Claims, 4 Drawing Sheets

A-1 Ra=5.904nm

A-2 Ra=0.335nm

A-3 Ra=1.304nm

PHOTOCURABLE RESIN COMPOSITION, FINELY EMBOSSED PATTERN-FORMING SHEET, FINELY EMBOSSED TRANSFER SHEET, OPTICAL ARTICLE, STAMPER AND METHOD OF FORMING FINELY EMBOSSED PATTERN

CROSS REFERENCE TO RELATED APPLICATION

This application claims the priority of Japanese patent application Serial No. 2001-197412 filed Jun. 28, 2001, Japanese patent application Serial No. 2001-280545 filed on Sep. 14, 2001 and Japanese patent application Serial No. 2001-280546 filed Sep. 14, 2001.

BACKGROUND OF THE INVENTION

1. Field of the Invention

The present invention relates to a photocurable resin composition excellent in shaping and form retention, which is particularly suitable for formation of a finely embossed surface structure on an optical article, a method of forming a finely embossed pattern by using the composition, a finely embossed pattern receptor (for example, a finely embossed pattern-forming sheet or a finely embossed pattern transfer sheet), an optical article and a stamper.

2. Description of the Related Art

Conventionally, a photocurable resin composition (coating) is applied onto a support such as polyester film to form a photocurable resin layer thereon, and then the surface of this photocurable resin layer is provided with various finely embossed patterns capable of exhibiting optical functions and exposed to active energy rays such as UV rays or electron rays to cure the resin layer, followed by laminating a metal-deposited layer or a layer having different refractive index on the surface of the formed embossed pattern, to form an optical article such as a diffraction grating or a relief hologram.

The optical article having a finely embossed pattern thereon is required of general properties such as embossed pattern accuracy, transparency, strength, resistance to wearing, heat resistance, water resistance, chemical resistance, adhesion to a substrate, flexibility or the like depending on its purpose. Accordingly, a photocurable resin composition forming the optical article should, first of all, satisfy these performance requirements.

The conventionally known method of forming a fine relief surface structure of an optical article includes the so-called 2P method (photo polymer method) for formation of e.g. a relief hologram wherein a press stamper (referred to hereinafter as "stamper") prepared from a master hologram having a desired finely embossed pattern formed thereon is pressure-welded with a liquid photocurable resin layer formed by applying a liquid photocurable resin composition onto a transparent support such as polyester film, and simultaneously irradiated at the side of the support with light to cure the resin layer, followed by removing the stamper therefrom.

For example, Japanese examined Patent Publication No. 4-5681 describes a photocurable resin composition usable in the 2P method, which comprises an oligomer having a hard segment (H), a soft segment (S) and a crosslinkable-terminal segment (E). This oligomer composition has the following advantages: an embossed pattern from a mold can be accurately reproduced; the composition is suitable for mass production because embossing can be successively carried out using one press stamper to produce a large number of articles; it is also excellent in releasability after curing by exposure to light and thus suitable for mass production in this respect too; optical articles excellent in strength, flexibility, optical transparency or uniformity, and resistance to common solvent can be obtained.

In the 2P method, however, there are the following problems: because the backside of the support is irradiated with light, curing is insufficient when the support is light-absorptive; the process is time-consuming because the stamper cannot be removed until curing is completed; because the photocurable resin layer is liquid, bubbles are easily introduced between the support and the stamper, to cause defects; and when the stamper is removed from the cured resin layer, the surface of the resin layer can string thus causing surface roughness.

As another method, there is a method wherein a photocurable resin composition which is highly viscous or solid at room temperature is applied onto a support to form a photocurable resin layer, then a stamper is pressure-welded therewith and then removed, and thereafter the photocurable resin layer is cured by irradiation with light (Japanese examined Patent Publication No. 5-46063, Japanese examined Patent Publication No. 6-85103).

In this method, there are the following advantages: the photocurable resin layer is irradiated directly with light, so the resin can be sufficiently cured; since the photocurable resin composition is highly viscous or solid, the support after coating can be rolled and stored or conveyed, that is, coating and reproduction can be carried out in separate processes; after the stamper is removed, the resin can be irradiated with light, so pressing with the stamper and curing can be carried out in separate processes; because bubbles are hardly introduced between the photocurable resin layer and the stamper, accurate patterning can be carried out; and when the stamper is removed from the photocurable resin layer, the surface of the resin layer hardly strings.

In the method of using the photocurable resin composition which is highly viscous or solid at room temperature, however, there are the following problems: because the stamper is removed from the resin layer in a un-cured state, apart of the photocurable resin composition easily adheres to and remains on the cavity of the stamper (phenomenon of partial remaining on the plate); accurate shaping cannot be achieved because as an embossed pattern to be reproduced is finer, the photocurable resin composition is more hardly filled in the cavity of the stamper; and after the stamper is removed, the resin layer in a un-cured state is irradiated with light, so the pattern can be easily deformed until curing is finished.

Japanese Patent Application Laid-open No. 2000-63459 describes a photocurable resin composition comprising a bulky group-containing urethane-modified acrylic resin and a release agent as essential ingredients. This photocurable resin composition comprises an urethane-modified acrylic polymer having crosslinkable groups, and has advantages such as accurate reproduction of an embossed pattern with a mold, suitability for mass production by virtue of excellent releasability from the mold even before curing, and other excellent general properties such as transparency, strength, resistance to wearing, heat resistance, water resistance, chemical resistance, adhesion to a base meterial, flexibility etc. Further, there is another advantage of excellent fitting after curing to the flex, expansion and contraction of the substrate.

According to the invention in Japanese Patent Application Laid-open No. 2000-63459 mentioned above, the photocurable resin composition comprising urethane-modified acrylic resin is applied onto a substrate and dried if necessary to form a photocurable resin layer, and a press stamper is pressed thereon (embossing), to form the embossed pattern of the press stamper (correctly a pattern complementary to the embossed pattern of the press stamper) on the resin layer, and thereafter the press stamper is removed from the resin layer, and then the resin is cured by exposure to light to fix the embossed pattern. Accordingly, embossing can be successively carried out without using the press stamper in the light exposure process, while light exposure is not hindered by the press stamper, and thus uniform and sufficient light exposure can be carried out in a short time.

When the stamper is removed from the photocurable resin layer in a un-cured state, a part of the photocurable resin adheres to and remains on the cavity of the stamper (phenomenon of partial remaining on the plate), thus causing a problem that successive and accurate embossing is hardly carried out using the same stamper. Against this problem, the photocurable resin composition described in the above Japanese Patent Application Laid-open No. 2000-63459 has the advantage that the photocurable resin composition is excellent in releasability even in a un-cured state and hardly adheres to the cavity of the stamper.

However, if as shown in the invention in Japanese Patent Application Laid-open No. 2000-63459 supra, the photocurable resin composition is applied onto a substrate and dried if necessary to form a layer on which a stamper is then pressed, the flexibility and fluidity of the photocurable resin composition can be insufficient so that the resin may not sufficiently spread throughout the cavity space, thus failing to accurately form the desired finely embossed pattern.

To improve the ability of a photocurable resin composition to be shaped (easiness of shaping and accuracy of shaping), there is a method of pressing a stamper with a layer comprising a photocurable resin composition formed on a support (that is, in a stamping or embossing process) wherein pressing is carried out under heating at a relatively high temperature and/or the speed of feeding the support is decreased to prolong the pressing time. However, there are problems such as damage to the stamper and deterioration in the support by increasing the pressing temperature and a drop in production efficiency by decreasing the speed of endowing a finely embossed pattern.

In an alternative method, a photocurable resin composition easily softened at room temperature can be used to improve easiness of shaping of a layer comprising the photocurable resin composition. However, if the photocurable resin composition easily softened at room temperature is used, a roll produced by rolling its photocurable resin layer formed on a support is sticky and liable to blocking, so there is inconvenience that it cannot be stored.

Further, even if the finely embossed pattern on the stamper can be accurately formed on the photocurable resin layer, the finely embossed pattern formed on the photocurable resin layer, when removed in a un-cured state from the stamper and exposed to light, is rounded and deformed to collapse its shape (called "sagging") due to the elasticity of the resin itself during the process of forming the finely embossed pattern. Such collapse of the shape is attributable mainly to e.g. heat transferred from the stamper to the un-cured photocurable resin layer upon heat embossing, heat upon UV irradiation of the photocurable resin layer having the finely embossed pattern formed thereon, etc.

For accurate and efficient reproduction of a finely embossed pattern having optical functions by using the photocurable resin composition, it is therefore necessary that the photocurable resin composition in the form of a layer containing less or no solvent has the ability to form a film sufficiently, to be shaped by fitting completely to the cavity of the stamper and to retain the sharp form formed by the press stamper even in the process after removal of the stamper from the photocurable resin.

In recent years, optical finely embossed patterns are becoming very complicate as precision processing technology is improved. These complicate optical finely embossed patterns can be used to form holograms of complicate design, information-recording elements, or optical elements highly regulating reflection, transmission, scattering, polarization, convergence or interference of whole rays and/or a light at a specific wavelength. However, such complicate and finely embossed patterns have narrower embossed pitches and/or deeper embossed portions than those of relatively simple holograms in the prior-art, thus making accurate reproduction more difficult, and satisfactory functions cannot be exhibited without reproduction of higher accuracy than in reproduction of relatively simple holograms in the prior-art.

Such complicate optical finely embossed patterns, even using the resin composition described in Japanese Patent Application Laid-open No. 2000-63459 supra, can not avoid the problems of the partial remaining of resin, the shaping ability of resin and the collapse of the pattern, and thus accurate reproduction is very difficult.

On one hand, Japanese Patent Application Laid-open No. 7-502128 describes an optical element having a surface structure obtained by embossing a transparent composite material having a 3-dimensional skeleton of inorganic or organic modified inorganic components in the form of nano-scale particles in a polymer matrix. According to this prior-art invention, shrink in the procedures of embossing and curing can be minimized. In the present invention, however, a photo- or thermosetting resin composition containing inorganic or organic modified inorganic components in the form of nano-scale particles is applied onto a substrate to form a photo- or thermosetting resin layer thereon, then cured by light exposure or heating while an embossing device is pressed on the resin layer, and subjected if necessary to pre-curing for increasing viscosity before attachment of the embossing device and/or post-curing for completion of copolymerization after removal of the embossing device. In this prior-art invention, basically the photo- or thermosetting resin layer is cured while the embossing device is pressed thereon, and it is not described therein that when the resin layer being still in the un-cured state is removed from the embossing device, collapse of the shape occurs due to the elasticity of the resin itself.

SUMMARY OF THE INVENTION

Main Objects of the Invention

The present invention was made in consideration of the background described above, and a first object is to provide a photocurable resin composition which can accurately reproduce a transparent layer having a finely embossed pattern excellent in shaping and form retention, particularly a finely embossed pattern-forming material also capable of accurately reproducing very complicate, finely embossed patterns in recent years.

A second object is to provide a photocurable resin composition which is not only capable of being accurately shaped because of its excellent fitting to the shape of a cavity in a mold such as a stamper complementary to a finely embossed pattern on an optical article, but also excellent in form retention after shaping thus hardly undergoing collapse of the shape (sagging) in the process after removal from the mold, to enable accurate reproduction of the desired finely embossed pattern.

A third object is to provide a photocurable resin composition which can reproduce a finely embossed pattern more accurately (preferably more accurately at a higher speed) than by the conventional photocurable resin composition, through embossing even at a relatively low temperature or in a relatively short time and can, at room temperature, prevent the photocurable resin layer formed on a support and rolled from blocking.

A fourth object is to provide a method of forming a finely embossed pattern having optical functions accurately and highly productively by utilizing the properties of the photocurable resin composition capable of achieving the first to third objects.

By utilizing the photocurable resin composition and the method of forming a finely embossed pattern, a fifth object is to provide a finely embossed pattern receptor (including a finely embossed pattern-forming sheet and a finely embossed pattern transfer sheet) excellent in accuracy of finely embossed pattern and thus excellent in optical performance, as well as an optical article and a stamper having a finely embossed pattern.

The present invention can achieve any of the objects described above or at least one of some objects made evident from the following description.

First Aspect of the Invention

A photocurable resin composition in a first aspect of the invention which is provided to solve the problem comprises, as essential components, (A) a binder resin having photopolymerizable functional groups and (B) inorganic superfine particles in the order of sub-micron which can be dispersed in a colloidal form in a diluting solvent for preparation of a coating liquid.

The inorganic superfine particles are incorporated into the photocurable resin composition in the first aspect of the invention, so that during the process including a light exposure process and a deposition process after a finely embossed pattern is given by pressing a press stamper on a photocurable resin layer comprising the photocurable resin composition and the stamper is removed, it is possible to prevent the finely embossed pattern from rounding and collapsing due to the elasticity of the resin composition itself.

Accordingly, the press stamper can be used successively in the stamping process without being used in the light exposure process, to produce the finely embossed pattern efficiently and successively.

Further, the photocurable resin composition of the invention is excellent in resistance to blocking by incorporating the inorganic superfine particles to reduce the tack of the surface, so an intermediate laminate having the photocurable resin layer formed on a flexible support such as a substrate film can be rolled, stored transiently, conveyed to another place and subjected to stamping.

Further, the fine superfine particles are incorporated into the photocurable resin composition of the invention thereby easily relaxing stress upon cure shrinkage, whereby various problems resulting from stress upon cure shrinkage can be solved. For example, when the photocurable resin composition is cured, resin cracking, curling, wrinkling etc. caused by cure shrinkage can be prevented. When a layer of the photocurable resin composition contained in a transfer sheet (transfer foil) is cured, it is possible to prevent partial cracking, curling and wrinkling of the foil attributable its difference in shrink from its adjacent layer, for example a film substrate, a release layer or a metal-deposited layer.

As the inorganic superfine particles (B), inorganic superfine particles in a thin (slender) form are preferably used to particularly improve the resistance to blocking, creep characteristics and form retention for the embossed pattern of the photocurable resin composition.

When the inorganic superfine particles (B) are spherical, their primary particle diameter is preferably in the range of 1 nm to 300 nm, in order to achieve sufficient transparency and creep characteristics.

The content of the inorganic superfine particles (B) is preferably in the range of 0.1 to 70% by weight relative to the total solids content of the photocurable resin composition, in order to achieve sufficient creep characteristics and film physical properties.

Further, the inorganic superfine particles (B) are preferably inorganic superfine particles having a surface treated to be compatible with a solvent, in order to disperse the particles easily in a colloidal form.

In the photocurable resin composition in the first aspect of the invention, the polystyrene conversion molecular weight of the binder resin is preferably in the range of 2,000 to 600,000 in order to complete the ability of the composition to form a film.

The binder resin preferably comprises at least one member selected from the group consisting of acrylic resin, urethane acrylate resin and polyester acrylate resin. The acrylic resin, urethane acrylate resin and polyester acrylate resin are excellent in transparency, strength, resistance to wearing, heat resistance, water resistance, chemical resistance, adhesion to the substrate, flexibility and fitting to the flex, expansion and contraction of the substrate, have a sufficient ability to form a film which on a substrate, can form embossed patterns by a stamper, plasticity and creep characteristics, and can be used to reproduce finely embossed patterns very accurately in combination with the inorganic superfine particles (B).

Further, the photocurable resin composition in the first aspect can be used to form a finely embossed pattern-forming layer on a support and used as a finely embossed pattern-forming sheet. This finely embossed pattern-forming sheet comprises the finely embossed pattern-forming layer comprising the photocurable resin composition in the first aspect formed thereon, is thus excellent in shaping upon pressing with a press stamper, as well as in form retention in a un-cured state after removal of the stamper, resistance to blocking, and absorption of stress in cure shrinkage, can efficiently and successively produce a surface structure having an accurate finely embossed pattern and hardly generates defective articles in reproducing the finely embossed pattern.

Generally, a photocurable resin composition excellent in form retention and resistance to blocking in a un-cured state is often inferior in low-temperature processability and tends to be inferior in shaping of finely embossed patterns and reproduction rate, but the photocurable resin composition in the first aspect has the effect of sufficiently improving accuracy and easiness of shaping during reproduction, as well as reproduction speed.

This finely embossed pattern-forming sheet in the first aspect hardly generates blocking even after rolled, stored and conveyed in the form of a roll stock.

Using the photocurable resin composition in the first aspect, a finely embossed pattern-forming layer capable of transfer can be formed on a support and used as a transfer sheet. By using the finely embossed pattern transfer sheet in the first aspect, the surface of even an article which is hardly subjected to embossing (stamping) can be provided efficiently with an accurate and finely embossed pattern.

This finely embossed pattern transfer sheet in the first aspect can be constituted so as to have at least a release layer, the finely embossed pattern-forming layer, a reflective layer selected from an opaque reflective layer and a transparent layer having a refractive index different from that of the finely embossed pattern-forming layer, and an adhesive layer laminated in this order on a support.

Then, the optical article in the first aspect of the invention has a surface structure having a finely embossed pattern made of a cured product of the photocurable resin composition in the first aspect. That is, the whole surface of the optical article or the surface of at least the portion where the finely embossed pattern is formed is made of a cured product of the photocurable resin composition in the first aspect, and the finely embossed pattern is formed by embossing and curing the photocurable resin composition layer arranged on the portion where the finely embossed pattern is to be formed.

The optical article in the first aspect is provided with a cured resin layer excellent in transparency, strength, resistance to wearing, heat resistance, water resistance, chemical resistance, adhesion to the substrate, flexibility and fitting to the flex, expansion and contraction of the substrate and having a surface structure with an accurately reproduced finely embossed pattern formed thereon to exhibit required optical functions, and finely embossed patterns usable for various purposes can be formed on the optical article.

The photocurable resin composition in the first aspect of the invention can be used not only in reproduction of finely embossed patterns for relief holograms and diffraction gratings, but also in successive mass-production of complicate and finely embossed patterns having higher optical functions by accurately embossing, for example finely embossed patterns on information-recording elements or optical elements regulating at least one of reflection, transmission, scattering, polarization, convergence and interference of whole rays and/or a light at a specific wavelength, and the photocurable resin composition can be used for optical articles for these purposes.

Furthermore, this photocurable resin composition can form a finely embossed pattern very accurately, so a finely embossed pattern to be given to an optical article can be used as a template from which an embossed pattern complimentary thereto is reproduced, and this pattern can be used as a stamper.

Then, the method of forming a finely embossed pattern in the first aspect of the invention comprises preparing an embossed pattern receptor provided with a finely embossed pattern-forming layer comprising the photocurable resin composition, pressing a stamper against the surface thereof to form an embossed pattern thereon, and curing the finely embossed pattern-forming layer.

According to the method of forming a finely embossed pattern in the first aspect, a transparent layer having a finely embossed pattern can be accurately reproduced, and particularly a surface structure of an optical article excellent in performance can be produced successively, accurately and rapidly by stamping.

In the method described above, it is preferable that after the stamper is removed from the finely embossed pattern-forming layer, the finely embossed pattern-forming layer is cured. According to this method, even if the finely embossed pattern-forming layer is cured after removal of the stamper, the shaped structure is hardly collapsed, and even if the finely embossed pattern receptor provided with the finely embossed pattern-forming layer in a un-cured state is rolled, there hardly occurs blocking, so the finely embossed pattern can be mass-produced successively.

In one mode of the above method, it is possible to use a finely embossed pattern transfer sheet having a finely embossed pattern-forming layer comprising at least the photocurable resin composition, said finely embossed pattern-forming layer being arranged in a transferable manner on a first support. When the finely embossed pattern transfer sheet is used, the finely embossed pattern can be formed by successive transfer onto the surface of an article having a complicate surface shape hardly subjected to direct embossing, or onto a support such as glass, plastics, metal plates etc. which cannot be rolled.

Second Aspect of the Invention

A photocurable resin composition in a second aspect of the invention which is provided to solve the problem comprises, as essential components, (C) a binder resin containing photopolymerizable functional groups and (D) hydrophobic fine silica particles.

Since the photocurable resin composition in the second aspect contains the hydrophobic fine silica particles (D), this composition has a lower softening initiation temperature than that of the composition not containing the hydrophobic fine silica particles or the composition containing hydrophilic fine silica particles, and is thus excellent in low-temperature processability, so the finely embossed pattern on the stamper can be reproduced easily and accurately by embossing at a relatively low temperature.

By incorporating the hydrophobic fine silica particles (D) into the photocurable resin composition, the releasability of the photocurable resin composition is improved, and when the stamper pressed against the photocurable resin layer is removed, the resin composition adheres hardly to the internal surface of the cavity of the stamper so that after the stamper is removed before curing from an intermediate laminate comprising a layer of the photocurable resin composition in the second aspect formed on a flexible support such as a substrate film, the intermediate laminate can be exposed to light, or after the stamper is removed, the intermediate laminate can be rolled or laminated, stored transiently, and transferred to another place where it can be subjected to stamping. Accordingly, this photocurable resin composition can be used to achieve a high speed of formation of the finely embossed pattern.

In the photocurable resin composition in the second aspect, the softening initiation temperature is reduced desirably by 2° C. or more upon addition of the hydrophobic fine silica particles (D).

The primary particle diameter of the hydrophobic fine silica particles (D) is preferably in the range of 3 to 100 nm, to sufficiently achieve the effect of reducing the softening initiation temperature and the transparency of the resin.

The content of the hydrophobic fine silica particles (D) is preferably in the range of 3 to 40% by weight relative to the total solids content of the photocurable resin composition, in order to achieve sufficient resistance to blocking and film physical properties.

In the photocurable resin composition in the second aspect of the invention, the polystyrene conversion molecular weight of the binder resin is preferably in the range of 2,000 to 600,000 in order to complete the ability of the composition to form a film.

The binder resin preferably comprises at least one member selected from the group consisting of acrylic resin, urethane acrylate resin and polyester acrylate resin. The acrylic resin, urethane acrylate resin and polyester acrylate resin are excellent in transparency, strength, resistance to wearing, heat resistance, water resistance, chemical resistance, adhesion to the substrate, flexibility and fitting to the flex, expansion and contraction of the substrate, have a sufficient film-forming ability to form a film on a substrate and shape embossed patterns by a stamper, plasticity and creep characteristics, and can be used to reproduce finely embossed patterns very accurately in combination with the hydrophobic fine silica particles (D).

Further, the photocurable resin composition in the second aspect can be used to form a finely embossed pattern-forming layer on a support and used as a finely embossed pattern-forming sheet. This finely embossed pattern-forming sheet comprises the finely embossed pattern-forming layer comprising the photocurable resin composition in the second aspect formed thereon, thus achieving excellent low-temperature processability and high processing speed during formation of the finely embossed pattern.

Generally, a photocurable resin composition excellent in low-temperature processability hardly forms an accurate finely embossed pattern because of easy sagging of the resin, but the photocurable resin composition in the second aspect contains the hydrophobic fine silica particles (D), thus preventing sagging of the resin composition formed by embossing at a relatively low temperature before exposure to light, to exhibit the effect of stably keeping the embossed shape of the resin composition (that is, the composition is excellent in the ability to retain its shape in a un-cured state).

Like the first aspect, the finely embossed pattern-forming sheet in the second aspect hardly generates blocking even after rolled, stored and conveyed in the form of a roll stock.

Using the photocurable resin composition in the second aspect, a finely embossed pattern-forming layer capable of transfer can be formed on a support and used as a transfer sheet in the same manner as in the first aspect. The finely embossed pattern transfer sheet in the second aspect can have the same layer constitution as in the first aspect.

The optical article in the second aspect of the invention is characterized by being provided with a surface structure having a finely embossed pattern formed from a cured product of the photo curable resin composition in the second aspect. The optical article in the second aspect is provided with a cured resin layer excellent in transparency, strength, resistance to wearing, heat resistance, water resistance, chemical resistance, adhesion to the substrate, flexibility and fitting to the flex, expansion and contraction of the substrate and having a surface structure with an accurately reproduced finely embossed pattern formed thereon to exhibit required optical functions, and finely embossed patterns usable for various purposes can be formed in the same manner as in the optical article in the first aspect.

Further, the stamper in the second aspect of the invention is also the same as in the first aspect, which is a stamper provided with a surface structure having a complementary pattern to the finely embossed pattern of the optical article, and the surface structure is characterized by being a cured product of the photocurable resin composition in the second aspect.

Like the method in the first aspect, the method of forming a finely embossed pattern in the second aspect of the invention comprises preparing an embossed pattern receptor provided with a finely embossed pattern-forming layer comprising the photocurable resin composition in the second aspect, pressing a stamper against the surface thereof to form an embossed pattern thereon, and curing the finely embossed pattern-forming layer.

According to the method of forming a finely embossed pattern in the second aspect, a transparent layer having a finely embossed pattern can be accurately reproduced, and particularly a surface structure of an optical article excellent in performance can be produced successively, accurately and rapidly by stamping, in the same manner as in the first aspect.

In the method in the second aspect, it is preferable for the same reason as in the first aspect that after the stamper is removed from the finely embossed pattern-forming layer, the finely embossed pattern-forming layer is cured.

In method in the second aspect too, it is possible to use a finely embossed pattern transfer sheet having a finely embossed pattern-forming layer comprising at least the photocurable resin composition, said finely embossed pattern-forming layer being arranged in a transferable manner on a first support. Accordingly, when the finely embossed pattern transfer sheet is used, the finely embossed pattern can be formed by successive transfer onto the surface of an article having a complicate surface shape hardly subjected to direct embossing, or onto a support such as glass, plastics, metal plates etc. which cannot be rolled.

Third Aspect of the Invention

The photocurable resin composition in the third aspect of the invention which is provided to achieve the problem comprises, as essential components, (E) a binder containing acrylic resin and urethane acrylate resin and/or polyester acrylate resin having photopolymerizable functional groups and (F) an organometallic coupling agent.

The photocurable resin composition in the third aspect, in a un-cured state before exposure to light, has the effect of preventing blocking by the organometallic coupling agent (F) In addition, a resin layer formed by applying this photocurable resin composition onto a support such as a substrate film has a smooth surface, thus increasing the reproduction speed in the process of forming finely embossed patterns.

The layer formed by applying this photocurable resin composition onto a support and then curing the binder resin with exposure to light has improvements in heat resistance and durability. In a transfer sheet for formation of a relief hologram, the cured resin layer has improved adhesion to a layer laminated adjacent there to (for example a metal-deposited layer) by the organometallic coupling agent (F), to improve transferability.

In the photocurable resin composition in the third aspect of the invention, when the binder resin (E) not containing the organometallic coupling agent (F), that is, a mixed resin of the acrylic resin and the urethane acrylate resin and/or polyester acrylate resin having a photocurable functional group is applied onto a support and a coating exhibits the average surface roughness (Ra) ranging preferably 1.0 nm or more, and more preferably 3.0 nm or more, most preferably 5.0 nm or more, the above-described effects are significantly brought about by incorporating the organometallic coupling agent into such a mixed resin.

The acrylic resin contained in the binder resin (E) is necessary for permitting the resultant optical material to exhibit transparency and strength or for endowing thermoplasticity in molding of a finely embossed pattern with a heat press. Further the photopolymerizable urethane acrylate and/or polyester acrylate are added to endow photopolymerizability and to increase crosslinkage density thereby endowing strength, heat resistance, resistance to wearing, water resistance and chemical resistance in addition to the properties of the acrylic resin.

When the organometallic coupling agent is not contained in the photocurable resin composition, a sheet formed by applying a mixture of the alkali resin and the photopolymerizable urethane acrylate and/or polyester acrylate onto a support is liable to be blocking because of adhesion upon being piled or rolled as a roll stock, but because the photocurable resin composition in the third aspect contains the organometallic coupling agent, blocking can be prevented.

As the organometallic coupling agent (F), an aluminum coupling agent is preferably used. The content of the organometallic coupling agent (F) is desirably 0.1 to 20% by weight relative to the total solids content of the photocurable resin composition, to achieve sufficient resistance to blocking and sufficient shelf stability of the rolled roll stock.

For sufficiently preventing surface tack and achieving thermal processability, the polystyrene conversion molecular weight of at least one binder resin (E) contained in the photocurable resin composition in the third aspect is preferably in the range of 2,000 to 600,000.

Further, the photocurable resin composition in the third aspect can be used to form a finely embossed pattern-forming layer on a support and used as a finely embossed pattern-forming sheet. This finely embossed pattern-forming sheet comprises a finely embossed pattern-forming layer made of the photocurable resin composition in the third aspect formed thereon, so that by embossing even at relatively low temperatures and/or in a relatively short time, a finely embossed pattern can be formed more accurately than by a conventional photocurable resin composition, and this layer is also superior in adhesion thereof to its adjacent layer such as a metal-deposited layer.

Like the first aspect, the finely embossed pattern-forming sheet in the third aspect hardly generates blocking even after rolled, stored and conveyed in the form of a roll stock.

Using the photocurable resin composition in the third aspect, a finely embossed pattern-forming layer capable of transfer can be formed on a support and used as a transfer sheet in the same manner as in the first aspect. The finely embossed pattern transfer sheet in the third aspect can have the same layer constitution as in the first aspect.

The optical article in the third aspect of the invention is characterized by being provided with a surface structure having a finely embossed pattern formed from a cured product of the photocurable resin composition in the third aspect. The optical article in the third aspect is provided with a cured resin layer excellent in transparency, strength, resistance to wearing, heat resistance, water resistance, chemical resistance, adhesion to the substrate, flexibility and fitting to the flex, expansion and contraction of the substrate and having a surface structure with an accurately reproduced finely embossed pattern formed thereon to exhibit required optical functions, and finely embossed patterns usable for various purposes can be formed in the same manner as in the optical article in the first aspect.

Further, the stamper in the third aspect of the invention is also the same as in the first aspect, which is a stamper provided with a surface structure having a complementary pattern to the finely embossed pattern of the optical article, and the surface structure is characterized by being a cured product of the photocurable resin composition in the third aspect.

Like the method in the first aspect, the method of forming a finely embossed pattern in the third aspect of the invention comprises preparing an embossed pattern receptor provided with a finely embossed pattern-forming layer comprising the photocurable resin composition in the third aspect, pressing a stamper against the surface thereof to form an embossed pattern thereon, and curing the finely embossed pattern-forming layer.

According to the method of forming a finely embossed pattern in the third aspect, a transparent layer having a finely embossed pattern can be accurately reproduced, and particularly a surface structure of an optical article excellent in performance can be produced successively, accurately and rapidly by stamping, in the same manner as in the first aspect.

In the method in the third aspect, it is preferable for the same reason as in the first aspect that after the stamper is removed from the finely embossed pattern-forming layer, the finely embossed pattern-forming layer is cured.

In method in the third aspect too, it is possible to use a finely embossed pattern transfer sheet having a finely embossed pattern-forming layer comprising at least the photocurable resin composition, said finely embossed pattern-forming layer being arranged in a transferable manner on a first support. Accordingly, when the finely embossed pattern transfer sheet is used, the finely embossed pattern can be formed by successive transfer onto the surface of an article having a complicate surface shape hardly subjected to direct embossing, or onto a support such as glass, plastics, metal plates etc. which cannot be rolled.

Figure 1:
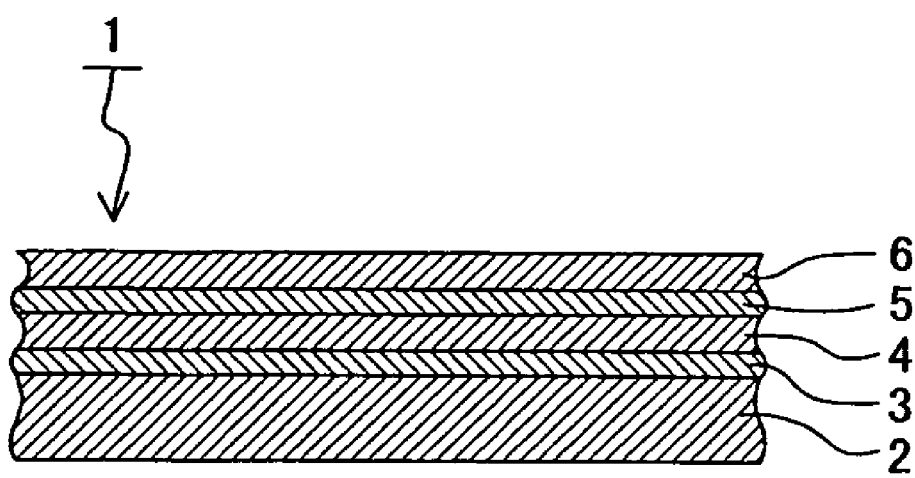
FIG. 1 is a schematic sectional view of one example of the finely embossed pattern transfer sheet.

The symbols used in the drawings are as follows: The transfer sheet or hologram-forming sheet (1); support (2); release layer (3); finely embossed pattern-forming layer (4); reflective layer (5); adhesive layer (6); hologram reproducing unit (10); main-body frame (12); bed (13); paper feeder (20); take-up roller (21); transfer unit (30); emboss roller (31); heat pressure roller (40); irradiation unit (50); take-up unit (60)

DESCRIPTION OF THE PREFERRED EMBODIMENTS

Hereinafter, the present invention is described in detail. The photocurable resin composition in each aspect of the invention is a material forming finely embossed patterns and is particularly suitable for formation of finely embossed patterns on optical articles.

First Aspect of the Invention

The photocurable resin composition in the first aspect of the invention comprises, as essential components, (A) a binder resin having photopolymerizable functional groups and (B) inorganic superfine particles in the order of submicron which can be dispersed in a colloidal form in a diluting solvent for preparation of a coating liquid.

If necessary, the photocurable resin composition in the first aspect may comprise other components such as a non-polymerizable binder resin, a monomer or oligomer having a photopolymerizable group, a release agent, an organometallic coupling agent, a photopolymerization initiator and a polymerization inhibitor.

(Binder Component)

As the binder component in the first aspect of the invention, a binder resin having photopolymerizable functional groups is used.

The photopolymerizable functional group undergoes polymerization reaction with visible rays or invisible rays including ionization radiations such as UV rays and electron rays, to form intermolecular crosslinkage in the binder resin, and may be either a photopolymerizable functional group in a narrow sense, which is directly activated by light irradiation to undergo photopolymerization reaction or a photopolymerizable functional group in abroad sense, which undergoes polymerization reaction initiated and promoted by the action of an active species generated from a photopolymerization initiator upon light irradiation in the co-presence of the photopolymerizable functional group and the photopolymerization initiator. The photopolymerizable functional group includes e.g. one having photo-radical polymerization reactivity such as ethylenically double bonds with, and one having photo-cation polymerizability and photo-anion polymerizability such as epoxy group of cyclic ethers, among which ethylenically double bonds are preferable. The ethylenically double bonds may be a (meth)acryloyl group, vinyl group, allyl group etc., among which the (meth)acryloyl group is preferable. To achieve sufficient crosslinkability, the binder resin preferably has at least two photopolymerizable functional groups in one molecule.

In this specification, (meth)acryloyl refers to both acryloyl and methacryloyl, (meth)acrylate to both acrylate and methacrylate, and (meth)acryl to both acryl and methacryl.

In the present invention, a resin having the ability to form a film which formed on a support such as a substrate film, has thickness enough to permit the film to be provided with a finely embossed pattern, has plasticity and creep characteristics by which a finely embossed pattern can be given by pressing with a stamper, and can form a surface structure having a finely embossed pattern satisfying general properties such as transparency, strength, resistance to wearing, heat resistance, water resistance, chemical resistance, adhesion to the substrate and flexibility depending on the intended use of optical articles after photocurable is suitably selected from those resins having photopolymerizable functional groups and used as the binder resin.

To permit the binder resin to have the ability to form a film on a support without being fluidized with no or less solvent, the binder resin is preferably not a liquid monomer component. From this viewpoint, at least a part of the binder resin having photopolymerizable functional groups is preferably a polymer component whose polystyrene conversion molecular weight is in the range of 2,000 to 600,000. The lower limit of the polystyrene conversion molecular weight is more preferably 5,000 or more. The upper limit of the polystyrene conversion molecular weight thereof is more preferably 500,000 or less, still more preferably 300,000 or less, further more preferably 200,000 or less. A molecular weight of less than 2,000 is not preferable because when a support coated with the resin composition is rolled, the coated surface may be stuck to the backside of the support, resulting in deterioration of the smoothness of the coated surface. On the other hand, a higher molecular weight of the binder resin leads to higher retention of embossed patterns, but when the polystyrene conversion molecular weight is greater than 600,000, the surface is hardly softened thus making it difficult to introduce the resin composition into a stamper, so the intended shape is hardly reproduced. Preferably, the binder resin having a molecular weight in the above-defined range accounts for at least 20% by weight of the whole binder resin.

As an arbitrary component, other binder resin having a molecular weight outside of the range defined above may be added to the essential binder resin. A binder resin having a polystyrene conversion molecular weight of less than 2,000 may be added if necessary for the purpose of reducing the softening initiation temperature of the resin, but in consideration of preventing surface tack and blocking of the roll stock, the amount of the arbitrary component is preferably not higher than 80% by weight of the whole binder resin.

As the binder, it is possible to use a polymer having polymerizable functional groups, for example acrylic resin such as urethane-modified acrylic resin, epoxy-modified acrylic resin etc., a resin having a hard segment, a soft segment and a polymerizable functional group as described in Japanese examined Patent Publication No. 4-5681 (the disclosure of this publication is incorporated by reference into the disclosure of this specification), urethane acrylate resin, polyester acrylate resin, polyether acrylate resin, epoxy acrylate resin etc., among which acrylic resin, urethane acrylate and polyester acrylate are preferably used singly or in combination thereof.

After curing, the acrylic resin, urethane acrylate resin and polyester acrylate resin are excellent in transparency, strength, resistance to wearing, heat resistance, water resistance, chemical resistance, adhesion to the substrate, flexibility, and fitting to the flex, expansion and contraction of the substrate, have the ability to form a film which can form an embossed pattern on a support by a stamper, plasticity, creep characteristics and thermoplasticity, and can thus be preferably used in the present invention. Particularly preferable among those described is the urethane-modified acrylic resin of formula 1.

Among the acrylic resin, urethane acrylate resin and polyester acrylate described above, the urethane-modified acrylic resin, urethane acrylate and polyester acrylate are particularly preferably used in the present invention because these resins are particularly excellent in fundamental performance requirements such as transparency, strength, resistance to wearing, heat resistance, water resistance, chemical resistance, adhesion to the substrate, flexibility and fitting to the flex, expansion and contraction of the substrate, the ability to form a film capable of forming an embossed pattern by a stamper, plasticity and creep characteristics after curing. Particularly preferable among those described is the urethane-modified acrylic resin of formula 1.

As the acrylic resin, a polymer having a main chain obtained by copolymerization of (meth)acrylate monomers, which has one or more polymerizable functional groups at the terminal of the main chain or in side chains, may be used.

As the monomer for synthesis of acrylic resin, various (meth)acrylate monomers and vinyl monomers can be used. For example, the acrylic resin in the present invention includes, but is not limited to, polymers obtained by copolymerization of alkyl acrylate monomers such as (meth)acrylic acid, methyl (meth)acrylate, ethyl (meth)acrylate, butyl (meth)acrylate etc.; acrylate monomers having a hydroxyl group, such as 2-hydroxyethyl (meth)acrylate, N-methylol (meth)acrylamide, 2-hydroxypropyl (meth)acrylate, 2-hydroxybutyl (meth)acrylate etc.; monomers endowing releasability, such as (meth)acryloyl modified polysiloxane, vinyl modified polysiloxane etc.; bulky monomers such as cyclohexyl (meth)acrylate, dicyclopentanyl (meth)acrylate, dicyclopentenyl (meth)acrylate, isobornyl (meth)acrylate etc.; monomers having an aromatic ring, such as benzyl (meth)acrylate, styrene, α-methyl styrene, 4-vinyl pyridine etc.; and acryloyl morpholine, vinyl pyrrolidone, vinyl caprolactone, dimethyl acrylamide, dimethyl aminoethyl (meth)acrylate etc.

For introduction of polymerizable functional groups into acrylic resin, monomers having polymerizable functional groups on their major chain may be copolymerized, or after formation of main-chain moieties by copolymerization, polymerizable functional groups may be introduced by modification reaction into side-chain moieties. For introduction into side chains, any linkages such as urethane linkage, epoxy linkage and ester linkage maybe introduced as the polymerizable functional groups, and urethane modification is preferable for endowing flexibility on the resin.

The acrylic resin is preferably urethane-modified acrylic resin represented by formula 1:

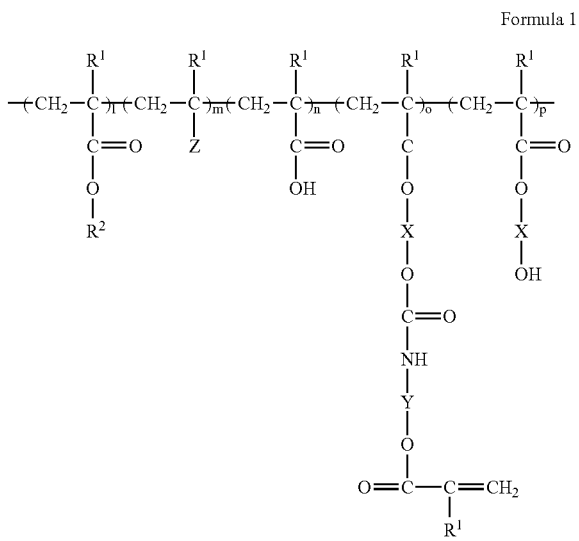

Formula 1 wherein Z represents a group for modifying the urethane-modified acrylic resin, preferably a group having a bulky cyclic structure; $R^1$ groups independently represent a hydrogen atom or a methyl group, $R^2$ represents a $C_1$ to $C_{16}$ hydrocarbon group, X and Y represent a linear or branched alkylene group; when the sum of l, m, n, o and p is 100, l is an integer of 0 to 90, m is 0 to 80, n is 0 to 50, o+p is 10 to 80, and p is 0 to 40.

In formula 1, Z can be introduced for modification of the urethane-modified acrylic resin, and for example, Z can be introduced by using (meth)acrylates having an aromatic ring such as phenyl group, naphthyl group etc. or a heteroaromatic ring such aspyridine, (meth)acryloyl modified silicone oil or resin, silicone oil or resin having polymerizable double-bond groups such as vinyl modified silicone oil or resin, (meth) acrylates having a long alkyl chain group, such as lauryl (meth)acrylate, stearyl (meth)acrylate etc., (meth)acrylates having a silicon-containing group, such as γ-(meth)alkoxypropyltrimethoxy silane etc., (meth)acrylates having a fluorine-containing group, such as 2-(perfluoro-7-methyloctyl)

ethyl acrylate, heptadecafluorodecyl (meth)acrylate etc., (meth)acrylates having a bulky structure, such as isobornyl (meth)acrylate, cyclohexyl (meth)acrylate, dicyclopentanyl (meth)acrylate, dicyclopentenyl (meth)acrylate, dicyclopentenyloxy ethyl (meth)acrylate, adamantyl (meth)acrylate etc., and vinyl monomers having a cyclic hydrophilic group, such as acryloyl morpholine, vinyl pyrrolidone, vinyl caprolactone etc. At least one of the above groups can be introduced as Z.

A preferable example of the urethane-modified acrylic resin of formula 1 is a resin which is obtained by reacting hydroxyl groups present in an acrylic copolymer obtained by copolymerizing 0 to 90 moles of methyl methacrylate, 0 to 80 moles of a vinyl monomer having a bulky group, 0 to 50 moles of methacrylic acid and 10 to 80 moles of 2-hydroxyethyl methacrylate, with methacryloyloxyethyl isocyanate (2-isocyanate ethyl methacrylate).

It is not always necessary for the methacryloyloxyethyl isocyanate to be reacted with every hydroxyl group present in the copolymer, and the methacryloyloxyethyl isocyanate may be reacted with at least 10 mole % preferably at least 50 mole % of the hydroxyl groups in 2-hydroxyethyl methacrylate units in the copolymer. Monomers having a hydroxyl group, for example N-methylol (meth)acrylamide, 2-hydroxyethyl (meth)acrylate, 2-hydroxypropyl (meth)acrylate, 4-hydroxybutyl (meth)acrylate etc. can also be used in place of, or in combination with, the 2-hydroxyethyl methacrylate.

The urethane-modified acrylic resin is dissolved in a solvent capable of dissolving the copolymer, for example toluene, ketone, cellosolve acetate, dimethyl sulfoxide etc., and while this solution is stirred, methacryloyloxyethyl isocyanate is added dropwise and reacted therewith, whereby an isocyanate group is reacted with a hydroxyl group in the acrylic resin to form an urethane linkage through which a methacryloyl group can be introduced into the resin. The amount of methacryloyloxyethyl isocyanate used is determined within a ratio of 0.1 to 5 moles preferably 0.5 to 3 moles of isocyanate group to 1 mole of hydroxyl group in the acrylic resin. When methacryloyloxyethyl isocyanate is used in an amount equivalent to or higher than hydroxyl groups in the resin, the methacryloyloxyethyl isocyanate can also react with a carboxyl group in the resin to generate a linkage —CONH—CH$_2$CH$_2$—.

The compounds of the above structural formula wherein all $R^1$ and $R^2$ groups represent a methyl group, and X and Y represent an ethylene group are exemplified above, but these compounds are not intended to limit the invention, and six $R^1$ groups may independently represent a hydrogen atom or a methyl group, and further examples of $R^2$ include a methyl group, ethyl group, n- or iso-propyl group, n-, iso- or tert-butyl group, substituted or unsubstituted phenyl group, substituted or unsubstituted benzyl group etc., and examples of X and Y include an ethylene group, propylene group, diethylene group, dipropylene group etc. The group Z having a bulky cyclic structure is preferably a monomer having a 5-, 6- or more membered bulky group such as isobornyl (meth)acrylate, cyclohexyl (meth)acrylate, dicyclopentanyl (meth)acrylate, dicyclopentenyl (meth)acrylate, dicyclopentenyloxyethyl (meth)acrylate, adamantly (meth)acrylate etc.

Any urethane acrylate having an urethane linkage and photopolymerizable (meth)acryloyl groups in its molecule can be used. The urethane acrylate is preferably urethane acrylate obtained by reacting an isocyanate compound having two or more isocyanate groups, a compound having two or more hydroxyl groups and a compound having one or more hydroxyl groups and one or more (meth)acryloyl groups, or urethane acrylate obtained by reacting an isocyanate compound having two or more isocyanate groups with a compound having two or more hydroxyl groups and one or more (meth)acryloyl groups.

The isocyanate compound having two or more isocyanate groups, used in synthesis of the urethane acrylate, includes tetramethylene diisocyanate, hexamethylene diisocyanate, 2,4-tolylene diisocyanate, 2,6-tolylene diisocyanate, 4,4'-diphenyl methane diisocyanate, 1,5-naphthalene diisocyanate, 3,3,-dimethyl-4,4-diphenylene isocyanate, isophorone diisocyanate, m-xylylene diisocyanate, p-xylylene diisocyanate, 1,3-bis(isocyanate methyl) cyclohexane, 1,3-bis($\alpha,\alpha$-dimethyl isocyanate methyl) benzene, trimethyl hexamethylene diisocyanate, hydrogenated xylylene diisocyanate etc. These can be used singly or in combination thereof.

Further, the isocyanate compounds represented by the following formulae 2a to 2g can also be used.

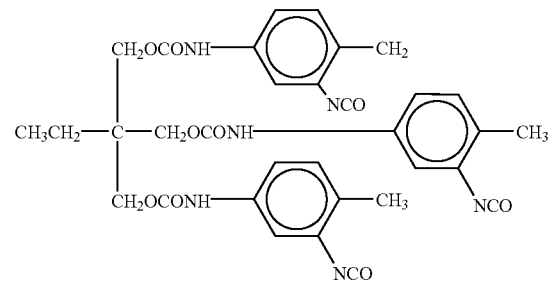

Formula 2a

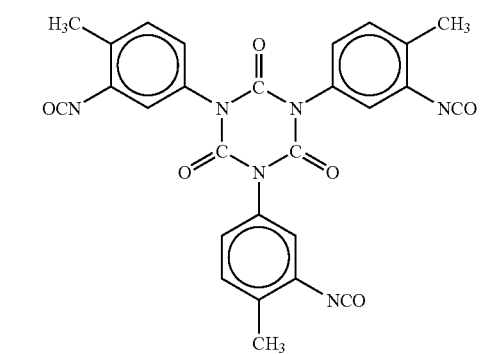

Formula 2b

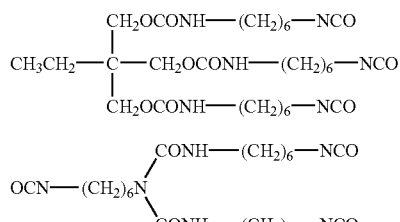

Formula 2c

Formula 2d

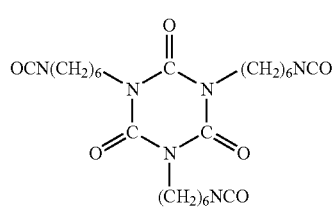

Formula 2e

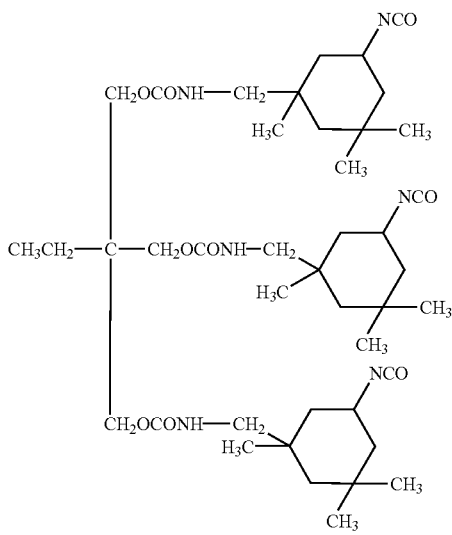

Formula 2f

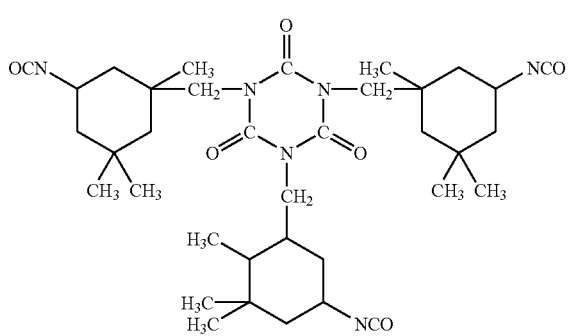

Formula 2g

The compound having two or more hydroxyl groups, used in synthesis of the urethane acrylate, includes e.g. 1,3-butanediol, 1,4-butanediol, trimethylol ethane, trimethylol propane, ditrimethylol ethane, ditrimethylol propane, pentaerythritol, dipentaerythritol, tripentaerythritol, diglycerol, glycerin, various other polysiloxane polyols, poly(oxyalkylene) polyol, polyester polyol, polyether polyol, polyether polyester polyol, polyolefin polyol, poly(alkyl acrylate) polyol, polycarbonate polyol etc.

The compound having one or more hydroxyl groups and one or more (meth)acryloyl groups, used in synthesis of the urethane acrylate, includes e.g. 2-hydroxyethyl (meth)acrylate, 2-hydroxypropyl (meth)acrylate, 4-hydroxycyclohexyl (meth)acrylate, 5-hydroxycycloctyl (meth)acrylate, 2-hydroxy-3-phenyloxypropyl (meth)acrylate, pentaerythritol triacrylate, dipentaerythritol pentacrylate and isocyanurate oxyethyl di(meth)acrylate, etc.

The urethane acrylate described above can be produced by reacting each of the above components under the reaction conditions described in Japanese Patent Application Laid-open No. 3-19842 (the disclosure of this publication is incorporated by reference into the disclosure of this specification).

Another example of the urethane acrylate is an active energy ray-curable composition which is tack-free even in a un-cured state after mere drying, as described in Japanese Patent Application Laid-open No. 2001-329031 (the disclosure of this publication is incorporated by reference into the disclosure of this specification). This tack-free composition contains a product having a melting point of 40° C. or more obtained by reacting an isocyanate compound having a melting point of 40° C. or more with a (meth)acryl compound having a (meth)acryloyl group and capable of reacting with an isocyanate group. The isocyanate compound having a melting point of 40° C. or more is preferably a compound having an isocyanate group bound to a non-aromatic hydrocarbon ring, more preferably a trimer of isophorone diisocyanates or a reaction product of isophorone diisocyanate and trimethylol propane in the molar ratio of 3:1. The (meth)acryl compound is preferably (meth)acrylic acid or (meth)acrylate having a hydroxyl group, such as hydroxyethyl (meth)acrylate.

Any polyester acrylate having an ester linkage and photopolymerizable (meth)acryloyl groups in its molecule can be used. The polyester acrylate is preferably a polyester acrylate obtained by reacting a compound having (meth)acryloyl groups with a polyester compound synthesized from a compound having two or more hydroxyl groups or a cyclic ester compound and a polybasic acid.

The compound having two or more hydroxyl groups, used in synthesis of the polyester acrylate, can be the same as in synthesis of the urethane acrylate described above.

The cyclic ester compound used in synthesis of the polyester acrylate includes, for example, a lactone compound such as ε-caprolactone, δ-valerolactone, γ-butyrolactone, γ-valerolactone etc., derivatives thereof, or addition reaction products of the lactone compound with an epoxy compound such as glycidyl methacrylate.

The polybasic acid used in synthesis of the polyester acrylate includes, for example, saturated polybasic acids such as adipic acid, succinic acid, sebacic acid etc.; unsaturated polybasic acids such as maleic acid, fumaric acid, itaconic acid, citraconic acid etc.; and aromatic polybasic acids such as phthalic acid, isophthalic acid, terephthalic acid, trimellitic acid etc.

In the present invention, one or more kinds of binder resin (A) having photopolymerizable functional groups can be used as the binder resin. In the present invention, a resin having no polymerizable functional group may be mixed therewith insofar as the object of the invention can be achieved. Such resin having no polymerizable functional group includes non-polymerizable transparent resin used conventionally in forming optical articles, for example, polyacrylic acid, polymethacrylic acid, polyacrylate, polymethacrylate, polyolefin, polystyrol, polyamide, polyimide, polyvinyl chloride, polyvinyl alcohol, polyvinyl butyral, polycarbonate etc.

(Inorganic Superfine Particles)

To prevent a finely embossed pattern from rounding and collapsing due to the elasticity of the photocurable resin during the process including a light exposure process and a deposition process after the finely embossed pattern is given by pressing a press stamper on a photocurable resin layer and the stamper is removed, the inorganic superfine particles (B) in the order of sub-micron which can be dispersed in a colloidal form in a diluting solvent are incorporated into the photocurable resin composition in the first aspect of the invention thereby improving creep characteristics and form retention.

By incorporating the fine superfine particles (B) into the photocurable resin composition, the releasability of the photocurable resin composition is also improved, and when the stamper pressed against the photocurable resin layer is removed, the resin composition hardly adheres to the internal surface of the cavity of the stamper, and further there is also the advantage that because the surface tack is lowered, blocking does not occur even if an intermediate laminate comprising the photocurable resin layer formed on a substrate film, before pressed by a press stamper, is rolled.

By compounding the fine superfine particles (B) with the photocurable resin composition of the invention, stress can be easily relaxed upon cure shrinkage whereby various problems resulting from stress upon cure shrinkage can be solved. For example, when the photocurable resin composition is cured, resin cracking, curling, wrinkling etc. caused by cure shrinkage can be prevented. When a layer of the photocurable resin composition contained in the transfer sheet is cured, it is possible to prevent partial cracking, kink and wrinkling of the foil attributable its difference in shrink from its adjacent layer, for example a film substrate, a release layer or a metal-deposited layer.

The photocurable resin composition of the invention, except for the case where it is prepared initially in a diluting solvent at a concentration used in the coating operation, may be stored at a high concentration containing less or no solvent and adjusted with a diluting solvent to a coating concentration just before the coating operation, and in any cases, it is necessary that inorganic superfine particles (B) can be uniformly dispersed finally in a colloidal state in a diluting solvent.

Examples of the inorganic fine particles include superfine particles of metal oxides such as $SiO_2$, $TiO_2$, $ZrO_2$, $SnO_2$, $Al_2O_3$ etc., from which the inorganic superfine particles in the order of sub-micron which can be dispersed in a colloidal form is preferably selected and used, and particularly fine particles of colloidal silica ($SiO_2$) are preferably used.

When the superfine particles of metal oxides are partially metal hydroxides and occur as a hydrated structure having water adsorbed therein, the particles can be advantageously easily dispersed in a colloidal form in a diluting solvent. Further, when an organic solvent is used as the diluting solvent, the particles can be easily dispersed in a colloidal state by treating the surfaces of the inorganic fine particles with substances having high affinity for organic solvent (treatment for rendering the particles compatible with solvent). When the inorganic superfine particles are metal oxides, the particles can have affinity for solvent by surface treatment with organic low-molecular substances such as organic amines and organic carboxylic acids.

To secure sufficient transparency for the coating, the inorganic superfine particles (B) used are those of superfine particle size. As used herein, the "superfine particles" are those particles of submicron order, and refer to those particles having a smaller particle diameter than that of particles generally called "fine particles" having several μm to several hundred μm. The specific size of the inorganic superfine particles (B) used in the present invention is varied depending on the intended use and grade of optical articles to which the photocurable resin composition of the invention is applied, but when the inorganic superfine particles are general spherical particles, those particles having a primary particle size in the range of 1 nm to 300 nm are preferably used. If the primary diameter is less than 1 nm, the creep characteristics of the resin composition are hardly improved, while if the primary particle diameter is greater than 300 nm, the transparency of the resin may be deteriorated, and the transparency may be insufficient depending on the use of the optical articles.

The inorganic superfine particles (B) may have any shapes, but fine particles in a bulky form, that is, fine particles in a form of lower density are preferable. By using the bulky inorganic superfine particles, the photocurable resin composition can have particular improvements in resistance to blocking, creep characteristics and retention of embossed patterns.

The bulky form can be for example a thin form, particularly a needle form or a pearl-necklace form where the thin particle extends on the same plane. The pearl-necklace form is a form of spherical particles connected in a row or in a series. When the fine superfine particles (B) are in a thin form, the particles are those having preferably thickness (diameter) in the range of 1 to 100 nm and length in the range of 10 to 500 nm, particularly preferably thickness in the range of 1 to 20 nm and length in the range of 40 to 300 nm. If the length is less than 10 nm, there is no difference from spherical silica, while if it is greater than 500 nm, transparency is deteriorated.

The thin form expressed as aspect ratio (ratio of length to thickness) is preferably 3 or more. The aspect ratio may be calculated from the thickness and length determined directly under a microscope, or the ratio ($D_1/D_2$) of the particle diameter ($D_1$ nm) determined by a dynamic light scattering method to the particle diameter ($D_2$ nm) determined by a nitrogen gas adsorption method can be calculated as the aspect ratio.

Preferable examples of the inorganic superfine particles in a thin form include needle silica having a thickness of 5 to 20 nm and a length of 40 to 300 nm and pearl-necklace silica having a thickness of 10 to 80 nm and a length of 50 to 500 nm when observed under an electron microscope, both of which have an aspect ratio of 3 or more. The form is particularly preferably needle silica that exhibits sufficient creep characteristics and blocking-preventing performance in a lower amount than that of the spherical one.

The inorganic superfine particles (B) are incorporated preferably in a ratio of 0.1 to 70% by weight relative to the total solids content of the photocurable resin composition, particularly preferably in a ratio of 1 to 50% by weight in the case of spherical fine particles or 0.1 to 30% by weight in the case of thin fine particles. If the ratio of the inorganic superfine particles (B) is less than 0.1% by weight, sufficient creep characteristics of the resin composition is hardly achieved, while if the ratio of the inorganic superfine particles (B) is greater than 70% by weight, brittleness becomes significant, and sufficient strength and surface hardness are hardly obtained after curing by light exposure. It is noted that the solids content of the photo curable resin composition also includes every liquid component excluding the solvent.

(Release Agent)

A release agent may be blended with the photocurable resin composition of the invention. By blending the release agent with the photocurable resin composition of the invention, partial remaining of the photocurable resin to a press stamper pressed against the resin can be prevented when the press stamper is removed, and thus the press stamper can be used successively for a prolonged period of time (repeated embossing).

As the release agent, a conventionally known release agent, for example solid wax such as polyethylene wax, amide wax, Teflon® powder etc., surfactants such as fluorine- or phosphate-based surfactants, silicone etc. may be used.

A silicone-type release agent is particularly preferable, by which very high releasability can be achieved at a higher contact angle of 90° or more to water. The silicone-type release agent includes polysiloxane, modified silicone oil, trimethyl siloxy silicic acid-containing polysiloxane, silicone-type acrylic resin etc.

The modified silicone oil is obtained by modifying side chains and/or terminals of polysiloxane and includes those polysiloxanes subjected to e.g. amino modification, epoxy modification, carboxyl modification, carbinol modification, (meth)acryl modification, mercapto modification, phenol modification, polyether modification, methylstyryl modification, alkyl modification, fluorine modification etc. One polysiloxane molecule can also be subjected to two or more modifications.

If a reactive silicone oil which is reactive to other coating-forming components is used among these silicone oils, the silicone oil is fixed via chemical bonds to the cured resin layer and thus prevented from bleeding out onto the surface of the cured resin layer, to prevent problems such as suppressed adhesion, contamination, deterioration etc. The reactive silicone oil is particularly effective in improvement of adhesion to the deposited layer in the deposition process.

As the silicone-type acrylic resin, (meth)acryloyl-modified silicone oil or acrylic resin produced by copolymerizing or grafting with silicon-containing monomers is used.

These silicone-type release agents can be added singly or in combination thereof.

The release agent is incorporated preferably in a ratio of 0.1 to 30% by weight in the total solids content of the photocurable resin composition. When the ratio of the release agent is less than this range, the releasability of the photocurable resin layer from the press stamper can be often insufficient. On the other hand, when the ratio of the release agent is greater than the above range, there arise problems such as roughness of the coating surface caused by repellency of the composition upon coating, inhibition of adhesion of the coating to the substrate and its adjacent layer for example a deposited layer in a product, and destruction of the coating during transfer (because of too low film strength).

(Monomer and Oligomer)

A monofunctional or multifunctional monomer or oligomer may be compounded with the photocurable resin composition of the invention in order to reduce the viscosity of the composition, to endow flexibility and to raise crosslinkage density.

The monofunctional monomer includes, for example, tetrahydrofurfuryl (meth)acrylate, hydroxyethyl (meth)acrylate, vinyl pyrrolidone, (meth)acryloyloxyethyl succinate, (meth)acryloyloxyethyl phthalate, isobornyl (meth)acrylate, cyclohexyl (meth)acrylate, dicyclopentanyl (meth)acrylate, dicyclopentenyl (meth)acrylate etc.

The multifunctional monomer or oligomer includes, for example, bifunctional monomers and oligomers such as polyethylene glycol di(meth)acrylate, polypropylene glycol di(meth)acrylate, neopentyl glycol di(meth)acrylate, 1,6-hexanediol di(meth)acrylate etc., trifunctional monomers, oligomers and polymers such as trimethylol propane tri(meth)acrylate, pentaerythritol tri(meth)acrylate, aliphatic tri(meth)acrylate etc., tetrafunctional monomers and oligomers such as pentaerythritol tetra(meth)acrylate, ditrimethylol propane tetra(meth)acrylate, aliphatic tetra (meth)acrylate etc., and penta- or more functional monomers and oligomers such as dipentaerythritol penta(meth)acrylate, dipentaerythritol hexa(meth)acrylate etc., as well as (meth)acrylates having a polyester skeleton, an urethane skeleton or a phosphazene skeleton.

As the monofunctional or multifunctional monomers and oligomers, it is possible to use not only the above-enumerated (meth)acrylates but also vinyl compounds such as styrene, vinyl toluene, chlorostyrene, bromostyrene, divinyl benzene, 1-vinyl naphthalene, 2-vinyl naphthalene, N-vinyl pyrrolidone etc., and allyl compounds such as diethylene glycol bisallyl carbonate, trimethylol propane diallyl, dialkyl phthalate, dimethacryl phthalate, diallyl isophthalate etc.

The monomer or oligomer in the first aspect of the invention is incorporated preferably in the range of 5 to 50% by weight relative to the solids content of the photocurable resin composition. When the ratio of the monomer or oligomer is less than the above range, it cannot be said that the resultant cured resin layer attains sufficient strength, heat resistance, resistance to wearing, water resistance, chemical resistance and adhesion to the substrate, while when the amount of the monomer or oligomer used is higher than the above range, the surface tack is increased to cause blocking and a part of the material remains(partial remaining) on a press (press stamper) during reproduction of holograms etc. to deteriorate repetitive embossing processability.

(Organometallic Coupling Agent)

An organometallic coupling agent may be incorporated into the photocurable resin composition of the invention in order to improve the heat resistance and strength of the surface structure having a finely embossed pattern, or adhesion thereof to the metal-deposited layer. As the organometallic coupling agent, various coupling agents such as, for example, a silane coupling agent, a titanium coupling agent, a zirconium coupling agent, an aluminum coupling agent etc. can be used.

The silane coupling agent includes, for example, vinyl silane such as vinyl trichlorosilane, vinyl tris(β-methoxyethoxy) silane, vinyl triethoxy silane, vinyl trimethoxysilane etc.; acryl silane such as γ-methacryloxy propyl trimethoxy silane, γ-methacryloxy propyl methyl dimethoxy silane etc.; epoxy silane such as β-(3,4-epoxycyclohexyl) ethyl trimethoxy silane, γ-glycidoxy propyl trimethoxy silane, γ-glycidoxy propyl methyl diethoxy silane etc.; and aminosilane such as N-β-(aminoethyl)-γ-aminopropyl trimethoxy silane, N-β-(aminoethyl)-γ-aminopropyl methyl dimethoxy silane, γ-aminopropyl trimethoxy silane, N-phenyl-γ-aminopropyl trimethoxy silane etc. Other silane coupling agents include γ-mercaptopropyl trimethoxy silane, γ-chloropropyl methyl dimethoxy silane, γ-chloropropyl methyl diethoxy silane etc.

The titanium coupling agent includes, for example, isopropyl triisostearoyl titanate, isopropyl tridecyl benzene sulfonyl titanate, isopropyltris(dioctyl pyrophosphate) titanate, tetraisopropyl bis(dioctyl phosphite) titanate, tetraoctyl bis(ditridecyl phosphite) titanate, tetra(2,2-diallyloxymethyl) bis(ditridecyl) phosphite titanate, bis(dioctyl pyrophosphate) oxyacetate titanate, bis(dioctyl pyrophosphate) ethylene titanate, isopropyl trioctanoyl titanate, isopropyl dimethacryl isostearoyl titanate, isopropyl isostearoyl diacryl titanate, isopropyl tri(dioctyl phosphate) titanate, isopropyl tricumyl phenyl titanate, isopropyl tri(N-aminoethyl.aminoethyl) titanate, dicumyl phenyloxy acetate titanate, diisostearoyl ethylene titanate etc.

The zirconium coupling agent includes, for example, tetra-n-propoxy zirconium, tetra-butoxy zirconium, zirconium tetraacetyl acetonate, zirconium dibutoxy bis (acetylacetonate), zirconium tributoxy ethyl acetoacetate, zirconium butoxy acetyl acetonate bis(ethyl acetoacetate) etc.

The aluminum coupling agent includes, for example, aluminum isopropylate, mono sec-butoxy aluminum diisopropylate, aluminum sec-butyrate, aluminum ethylate, ethyl acetoacetate aluminum diisopropylate, aluminum tris (ethyl acetoacetate), alkyl acetoacetate aluminum diisopropylate, aluminum monoacetyl acetonate bis(ethyl acetoacetate), aluminum tris(acetyl acetoacetate) etc.

The organometallic coupling agent is incorporated in a ratio of 0.1 to 15% by weight relative to the total solids content of the photocurable resin composition. When the ratio of the organometallic coupling agent is less than this range, the effect of endowing heat resistance, strength and adhesion to a deposited layer is insufficient. On the other hand, when the ratio of the organometallic coupling agent is higher than the above range, the stability and film-forming properties of the composition may be deteriorated.

(Photopolymerization Initiator)

A photopolymerization initiator having activity depending on the wavelength of a light source used may be incorporated if necessary into the photocurable resin composition of the invention. As the photopolymerization initiator, the one generating a suitable active species depending on the difference in the reaction system of the binder and monomer (for example radical polymerization and cationic polymerization) is used.

The photo-radical polymerization initiator includes, for example, benzoin type compounds such as benzoin, benzoin methyl ether, benzoin ethyl ether, benzoin isopropyl ether, α-methyl benzoin, α-phenyl benzoin etc.; anthraquinone type compounds such as anthraquinone, methyl anthraquinone etc.; phenyl ketone type compounds such as benzyl diacetyl acetophenone, benzophenone etc.; sulfide type compounds such as diphenyl disulfide, tetramethyl thiuram sulfide etc.; α-chloromethyl naphthalene; anthracene; and halogenated hydrocarbons such as hexachlorobutadiene, pentachlorobutadiene etc.

The photo-cationic initiator includes, for example, aromatic diazonium salts, aromatic iodonium salts, aromatic sulfonium salts, aromatic phosphonium salts, mixed ligand metal salts etc.

The photo-anionic polymerization initiator includes, for example, 1,10-diaminodecane, 4,4'-trimethylene dipiperidine, carbamates and derivatives thereof, cobalt/amine complexes, aminoxyimino compounds, ammonium borates etc.

The photopolymerization initiator is incorporated preferably in a ratio of 0.5 to 10% by weight relative to the total solids content of the photocurable resin composition. The photopolymerization initiators may be used singly or in combination thereof.

A polymerization inhibitor may be incorporated into the photocurable resin composition of the invention in order to improve shelf stability. Examples of the polymerization inhibitor include phenols such as hydroquinone, t-butyl hydroquinone, catechol, hydroquinone monomethyl ether etc.; quinones such as benzoquinone, diphenyl benzoquinone etc.; phenothiazine and analogues thereof; copper etc. The polymerization inhibitor is incorporated preferably in a ratio of 0.1 to 10% by weight relative to the total solids content of the photocurable resin composition.

(Solvent)

The photocurable resin composition of the invention is prepared in the form of a coating liquid usually by using a diluting solvent (prime solvent) and used in formation of finely embossed patterns. Each of the materials described above is dispersed and dissolved in acetone, methyl ethyl ketone, methyl isobutyl ketone, cyclohexanone, benzene, toluene, xylene, chlorobenzene, tetrahydrofuran, methyl cellosolve, ethyl cellosolve, methyl cellosolve acetate, ethyl cellosolve acetate, ethyl acetate, 1,4-dioxane, 1,2-dichloroethane, dichloromethane, chloroform, methanol, ethanol, isopropanol etc. or a mixed solvent thereof, whereby a coating liquid of the photocurable resin composition of the invention can be prepared. The coating liquid is prepared usually at a solids content concentration of about 10 to 50% by weight.

(Method, Sheet and Transfer Sheet for Formation of Finely Embossed Patterns)

The photocurable resin composition of the present invention is applied onto the surface of a support such as a substrate film, dried if necessary to form a finely embossed pattern-forming material layer (finely embossed pattern-forming layer) to prepare an embossed pattern receptor, subjected to embossing by pressing a stamper onto the surface of the finely embossed pattern-forming layer of the embossed pattern receptor, to endow a finely embossed pattern thereon, and thereafter the finely embossed pattern-forming layer is cured by exposure to light, whereby the finely embossed pattern can be formed.

Before or after application of the finely embossed pattern-forming layer on to a support, or before or after formation of a finely embossed pattern on the finely embossed pattern-forming layer, other layers such as an anchor layer, a release layer, a thin metal layer, an overcoat layer, and a pressure-sensitive or heat-sensitive adhesive layer may be formed.

The finely embossed pattern thus obtained can be utilized for various purposes for use in optical articles, stampers etc.

In the procedure of pressing a stamper onto the finely embossed pattern-forming layer to shape the embossed pattern surface and then curing it, the finely embossed pattern-forming layer may be cured while the stamper is pressure-welded therewith, for example by conducting embossing and light exposure almost simultaneously. However, the photocurable resin composition of the invention is excellent in the ability to retain the shape provided thereon, so the finely embossed pattern-forming layer is embossed by contact-welding the stamper therewith, and after removal of the stamper, the layer can be subjected to light exposure and heating.

The later procedure has the following advantages over the former procedure wherein embossing and light exposure are simultaneously conducted and then the stamper is removed from the sheet having a layer of cured resin with the finely embossed pattern formed thereon.

(i) The later procedure is superior to the former procedure in successive productivity because the stamper can be successively used in the embossing process by removing the stamper before the finely embossed pattern-forming layer is transferred to the curing process.

(ii) According to the later procedure, the finely embossed pattern-forming layer can be exposed to light directly but not through the support. Accordingly, the absorption of exposure light by the support can be prevented, the efficiency of light exposure is improved, and the deterioration of the support by exposure to light such as UV rays can also be prevented.

(iii) According to the later procedure, the stamper is not irradiated with exposure light, so the stamper even if made of resin can be prevented from being deteriorated in the exposure process.

(iv) According to the later procedure, the finely embossed pattern-forming process and the light exposure process can be conducted in different units respectively without using a large-scale unit designed to be capable of simultaneously conducting these processes.

(v) In the former procedure, when the stamper is removed after the finely embossed pattern-forming layer is cured, the surface of the cured resin can be easily damaged, but according to the later procedure, the finely embossed pattern-forming layer in a un-cured state can be removed from the stamper, and thus such damage can be prevented.

In the present invention, the finely embossed pattern-forming material is superior in film formability and resistance to blocking, and by utilizing these properties, an intermediate laminate having the finely embossed pattern-forming layer formed on a substrate film can be rolled, stored temporarily, conveyed to another place, unrolled, and subjected to stamping and curing.

Further, the intermediate laminate subjected to stamping and curing can be rolled, stored temporarily, conveyed to another place, unrolled, and cured sufficiently in an additional photo- or thermosetting process as necessary, or may be provided if necessary with a metal thin layer, an overcoat layer, a pressure- or heat-sensitive adhesive layer etc. on the finely embossed pattern.

The light used for curing the photocurable resin composition of the invention includes high-energy ionization radiations and UV rays. As a high-energy ionization radiation sources, electron rays accelerated by accelerator such as a Cockcroft type accelerator, a Van de Graaff type accelerator, a linear accelerator betatron and cyclotron can be used industrially most conveniently and economically, and further radiations such as γ-rays, X-rays, α-rays, neutron rays, proton rays etc. radiated from radioisotopes, a nuclear reactor etc. can also be used. The UV source includes, for example, a UV ray fluorescent lamp, a low-pressure mercury lamp, a high-pressure mercury lamp, an ultrahigh-pressure mercury lamp, a xenon lamp, a carbon arc lamp, and sunrays.

Figure 2:
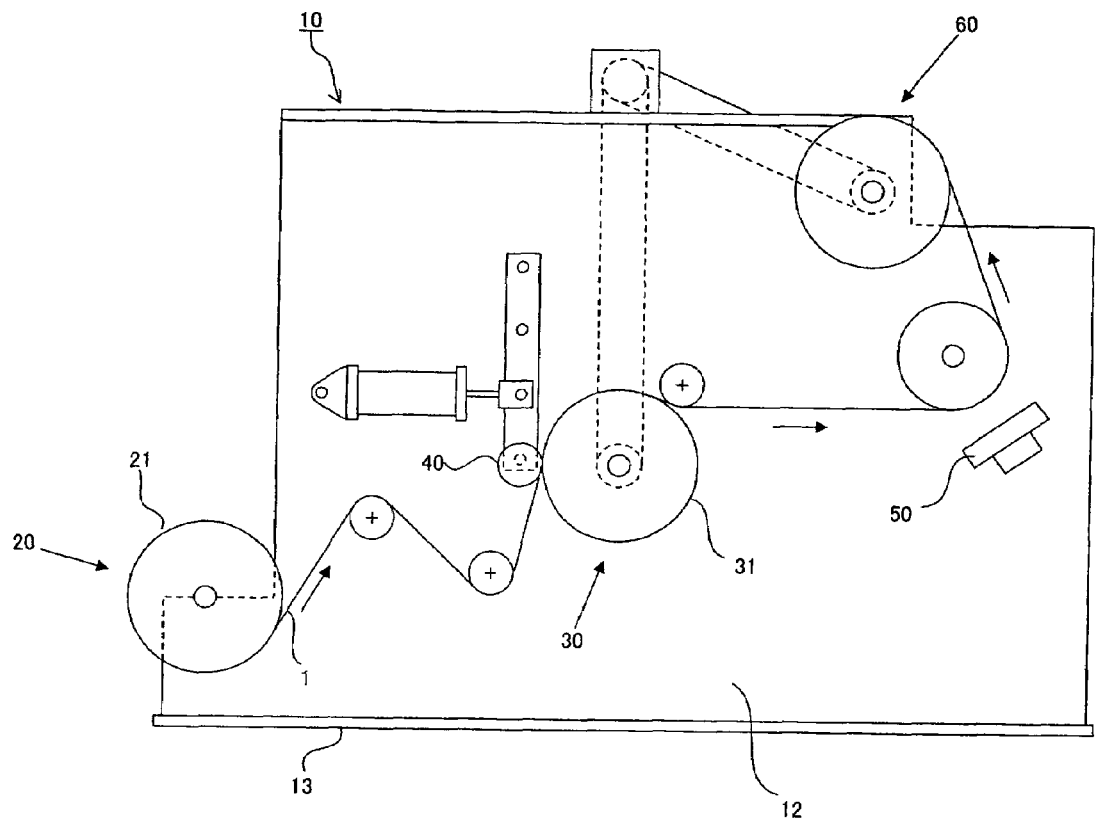
FIG. 2 is a drawing showing the structure of a hologram-reproducing unit used in the method of forming a finely embossed pattern according to the present invention.

FIG. 2 is an example of the constitution of a hologram-reproducing device used in the method of forming a finely embossed pattern according to the present invention. The hologram-reproducing device 10 shown in FIG. 2 comprises a paper feeder 20, a transfer unit 30, an irradiation unit 50 and a take-up unit 60 arranged in this order on a pair of main frames 12 fixed on bed 13. A roll formed by rolling, on a take-up roller 21, a hologram-forming sheet (hologram-forming film) 1 having a layer of the photocurable resin composition formed on a support film is fit on the paper feeder 20. A heat pressure roller 40 capable of heat-rolling the hologram-forming sheet 1 delivered from the paper feeder 20 and an emboss roller 31 provided thereon with a hologram plate are fit to the transfer unit 30. The hologram-forming sheet 1 delivered from the transfer unit 30 is irradiated with UV rays or electron rays from the irradiation unit 50, whereby the hologram layer can be cured. The hologram sheet having the cured hologram layer can be wound around the take-up unit 60.

In FIG. 2, a press stamper formed from a master hologram prepared by a laser light is fit to the emboss roller 31 in the hologram-reproducing unit 10. A press stamper produced by preparing a reproducing hologram on a resin plate by using a master hologram and then sticking the reproducing hologram on a cylinder can also be used.

The method of forming a finely embossed pattern by use of the photocurable resin composition of the invention is described in detail by reference to a relief hologram. First, a substrate such as a metal plate, paper, polyethylene terephthalate etc. is coated or impregnated with the photocurable resin composition, then placed in a heating oven set at a temperature at which the organic solvent contained in the composition is evaporated, for example at 100 to 165° C. for about 0.1 to 1 minute, whereby the photocurable resin layer is dried and formed on the substrate to give a finely embossed pattern receptor. In this coating and drying process, the formation, coating and drying of the photocurable resin layer using a solvent system locally present on the surface of the coating layer is effective in preventing blocking and also in improving repeated embossing during reproduction.

The finely embossed pattern receptor is generally a finely embossed pattern-forming sheet produced by applying the photocurable resin composition of the invention onto a film support and dying it if necessary to form a photocurable resin layer in a dry or non-dry state on the support. The finely embossed pattern-forming sheet may be a continuous or cut sheet. The suitable film support includes, but is not limited to, a plastic film such as polyethylene, polypropylene, ethylene-vinyl acetate copolymers, polyvinyl acetate, polyvinyl alcohol, polyvinyl chloride, polyvinylidene chloride, polystyrene, polymethyl methacrylate, nylon, polyethylene terephthalate, polyimide, polycarbonate, polynorbornene, triacetyl cellulose etc.

The support may be a rigid substrate such as a metal plate or plastic plate, or an article having a 3-dimensional surface shape. Further, the finely embossed pattern receiptor may be the one whose surface of the portion to be provided with the finely embossed pattern is made of the photocurable resin layer, but the whole of the finely embossed pattern receiptor may be made of the photocurable resin composition of the invention.

Then, the photocurable resin layer of this finely embossed pattern receiptor is subjected to patterning (embossing) of a desired hologram relief by e.g. a press stamper. When the finely embossed pattern-forming sheet in the form of a continuous sheet is used, a transiently stored roll stock which was prepared by applying the photocurable resin composition onto a film support and rolling it in a dry or non-dry state can be unrolled, thus delivering and supplying the finely embossed pattern-forming sheet, which can then be subjected to embossing and light exposure almost simultaneously or successively.

The embossing of a hologram pattern is carried out at a temperature of e.g. 50 to 150° C. at a pressure of 10 to 50 kg/cm$^2$ in a usual manner by using a pair of emboss rollers consisting of a paper roll and a metal roll provided therearound with a press stamper produced from a mold previously produced by a laser light. In the reproducing unit, an emboss roller produced by forming a reproducing hologram on a resin plate by using a master hologram and then sticking the reproducing hologram on a cylinder can also be used.

Embossing of one side of the photocurable resin layer is sufficient, but both sides thereof may be subjected to embossing. For embossing, it is important to establish the temperature of the emboss roll, and from the viewpoint of reproduction of the emboss shape, embossing is carried out preferably at a relatively high temperature and a relatively high pressure, whereas in preventing adhesion to the emboss sheet, embossing is carried out preferably at a relatively low pressure, thus being contrast with each other. From the viewpoint of effectively working heat capacity, the feed speed (delivery speed) of the finely embossed pattern-forming sheet is also important. In addition, the heat resistant temperature is varied depending on the material of the film support, so in consideration of the material, the heating temperature and the feed speed of the finely embossed pattern-forming sheet should be suitably established. Further, selection of the release agent described above is also important for reducing the adhesion of the resin composition to the emboss roll.

The photocurable resin layer is subjected to embossing, removed from the stamper, and thereafter irradiated with UV rays or electron rays to photoset the resin layer. Because the hologram is generally transmittable, and thus the photoset resin layer should be provided with a reflective layer. When a light-reflective metal thin layer is used as the reflective layer, the resultant hologram is opaque, and when a reflective layer using a transparent material having refractive index different from that of the hologram layer is used, the resultant hologram is transparent, and either hologram can be used. The reflective layer consisting of a metal thin layer can be formed by known techniques such as sublimation, vacuum deposition, sputtering, reactive sputtering, ion plating, electroplating etc.

The metal thin layer forming the opaque hologram comprises, for example, a metal such as Cr, Ti, Fe, Co, Ni, Cu, Ag, Au, Ge, Al, Mg, Sb, Pb, Pd, Cd, Bi, Sn, Se, In, Ga or Rb, an oxide thereof or a nitride thereof, or a combination thereof, and can be formed by techniques such as chemical deposition, physical deposition etc. Among the metal thin layer, Al, Cr, Ni, Ag, Au etc. are particularly preferable, and the thickness of the layer is in the range of 1 to 10,000 nm, desirably 20 to 200 nm.

The thin layer forming the transparent hologram may be made of any light-transmittable materials exhibiting the hologram effect. For example, a transparent material having refractive index different from that of the resin used in the hologram-forming layer (photocurable resin layer) can be used. The refractive index in this case may be higher or lower than the refractive index of the hologram-forming layer, but the difference in refractive index therebetween is preferably 0.1 or more, more preferably 0.5 or more, most preferably 1.0 or more. The thin layer forming the transparent hologram includes a metallic transparent reflective layer. The transparent reflective layer preferably used includes titanium oxide ($TiO_2$), zinc sulfide (ZnS) etc.

For example, it is also possible to use a layer of high-refractive material formed by coating a coating liquid containing high-refractive fillers dispersed therein or by coating a gold and silver colloidal solution, or by forming a coating of an organometallic compound through hydrolysis polycondensation reaction represented by sol-gel reaction.

The embossed pattern receptor may be an end product to be provided with a surface structure having the finely embossed pattern, but may be an intermediate transfer medium. That is, in the present invention, the photocurable resin composition is applied onto a first support thereby forming a finely embossed pattern-forming layer, to prepare a transfer sheet, and a finely embossed pattern is formed on the finely embossed pattern-forming layer of this transfer sheet, and the finely embossed pattern-forming layer is cured and then transferred to a second support (end product). When the transfer sheet is used, there is the advantage that direct embossing of the surface of the end product is not necessary, or a large number of the finely embossed pattern can be successively and previously formed on the transfer sheets, and for example the finely embossed pattern can be formed by successive transfer onto the surface of an article having a complicate surface shape hardly subjected to direct embossing, or onto a support such as glass, plastics, metal plates etc. which cannot be rolled.

In the present invention, the finely embossed pattern-transfer sheet is a laminate in which a finely embossed pattern-forming layer comprising at least the photocurable resin composition of the invention is provided on a first support in a releasable and transferable state from the first support to a second support, and can be provided with one or more layers selected from a release layer, a reflective layer, an adhesive layer and other layers if necessary in addition to the finely embossed pattern-forming layer. As shown in FIG. 1, the transfer sheet 1 may be constituted for example by laminating the release layer 3, the finely embossed pattern-forming layer (photocurable resin composition layer) 4, the reflective layer (the opaque reflective layer or the transparent layer having refractive index different from that of the finely embossed pattern-forming layer) 5, and the adhesive layer 6 laminated in this order on the support 2.

As the support for preparation of the transfer sheet, a flexible substrate film is ordinarily used, and the support preferably used for strength and heat resistance includes, but is not limited to, plastic films such as polyethylene, polypropylene, ethylene-vinyl acetate copolymers, polyvinyl acetate, polyvinyl alcohol, polyvinyl chloride, polyvinylidene chloride, polystyrene, polymethyl methacrylate, nylon, polyethylene terephthalate, polyimide, polycarbonate, polynorbornene, triacetyl cellulose etc., but materials not having flexibility or other materials such as metal plate, paper etc. can also be used as the support. Further, when a support such as paper capable of being impregnated is used, the finely embossed pattern-forming layer may be formed in such a state that it is impregnated in the structure of the support, and even such a state is included in one form of the finely embossed pattern-forming layer provided on the support. In consideration of mass productivity of finely embossed patterns on holograms etc., a continuous film may be used as the substrate film, but a cut substrate film may be used.

For the purpose of improving the releasability of the transfer sheet and cuttability (deviding ability) of the finely embossed pattern-forming layer, the release layer is arranged if necessary as a lower layer of the finely embossed pattern-forming layer, and after transfer together with the finely embossed pattern-forming layer from the transfer sheet to a certain transfer material (second support), the release layer serves as the outermost layer. As the release layer, one or more members selected from e.g. acrylic resin, polyester resin, polyvinyl chloride resin, vinyl chloride-vinyl acetate copolymers, cellulose resin, silicone resin, chlorinated rubber, casein, various surfactants, metal oxides etc. can be used. Further, if a release agent is added to the photocurable resin composition of the invention usable as the finely embossed pattern-forming layer, the photocurable resin composition can also be used as the release layer.

For example, when a relief hologram is formed, the reflective layer is arranged on the finely embossed pattern. The reflective layer may be either transparent or opaque, and can be made of the metal thin layer or high-refractive layer described above.

For the purpose for improving the transferability of the finely embossed pattern-forming layer and the adhesion to a transferred material after transfer or for improving the adhesion to a reflective layer or a protective layer if the embossed surface of the finely embossed pattern-forming layer is coated with them after embossing process, the adhesive layer is provided as the outermost surface on the finely embossed pattern-forming layer, and after transfer together with the finely embossed pattern-forming layer, the adhesive layer constitutes the lowermost layer.

The adhesive layer can be suitably selected and used among known heat-sensitive adhesive resin, pressure-sensitive adhesive resin, a two-part liquid type curing adhesive and a photocurable adhesive. The heat-sensitive adhesive resin includes, for example, rubber type adhesives such as polyisoprene rubber, polyisobutylene rubber, styrene butadiene rubber etc.; (meth)acrylate type adhesives such as polymethyl (meth)acrylate, polyethyl (meth)acrylate, polypropyl (meth)acrylate, polybutyl (meth)acrylate, poly(2-ethylhexyl (meth) acrylate) etc.; polyvinyl ether type adhesives such as polyisobutyl ether etc.; polyvinyl type adhesives such as polyvinyl chloride, polyvinyl acetate, vinyl chloride-vinyl acetate copolymers, polyvinylidene chloride, polyvinyl butyral etc.; polyamide type adhesives such as polyacrylamide, polymethylol acrylamide etc.; vinyl type adhesives such as polyvinyl butyral, vinyl acetate/octyl acrylate, vinyl acetate/butyl acrylate, vinylidene chloride/butyl acrylate etc.; aromatic vinyl type adhesives such as polystyrene etc.; and polyolefin chloride, and from these adhesives, one or more adhesives can be selected and used.

One example of forming the relief hologram transfer sheet is described below. The symbols used are those referring to FIG. 1. First, a substrate film 2 consisting of a continuous plastic such as polyethylene terephthalate is delivered from the roll stock. The substrate film thus delivered is coated by a roll coater with a coating liquid of a release agent, and then dried for about 0.1 to 1 minute in a heating oven set at a temperature (e.g. 100 to 165° C.) at which the organic solvent contained in the coating liquid is evaporated, whereby the release layer 3 is formed thereon. Subsequently, a finely embossed pattern-forming material comprising the photocurable resin composition is applied by a roll coater onto the release layer 3 and then placed for about 0.1 to 1 minute in a heating oven at a temperature (e.g. 100 to 165° C.) at which the organic solvent contained in the composition is evaporated, whereby the finely embossed pattern-forming layer 4 is formed to prepare the transfer sheet 1. As a coater other than the above roll coater, for example a gravure coater, a curtain coater, a flow coater, a lip coater, a doctor blade coater etc. can also be used. The thickness of the finely embossed pattern-forming layer is usually about 0.1 to 5.0 μm. The prepared transfer sheet 1 is wound again to form a roll stock, and stored or conveyed.

Then, the transfer sheet is delivered from the roll stock, the finely embossed pattern-forming layer is subjected to embossing by pressing a stamper for relief hologram onto the surface thereof to form a finely embossed pattern (not shown in the drawing).

The embossing of a hologram pattern is carried out at a heat roll temperature of e.g. 100 to 200° C. at a pressure of $5 \times 10^3$ to $5 \times 10^6$ Pa in a usual manner by using a pair of emboss rollers consisting of a paper roll and a metal roll provided therearound with a stamper produced from a mold previously produced by a laser light or electron ray. When the heat roll temperature is higher than the above range, embossing can be rapidly conducted, but the substrate film is significantly damaged. When the heat roll temperature is lower than the above range, the embossing process is prolonged because it is time-consuming to increase the resin temperature. In the reproducing unit, an emboss roller produced by forming a reproducing hologram on a resin plate by using a master hologram and then sticking the reproducing hologram on a cylinder can also be used.

In this case too, either one side or both sides of the photocurable resin layer can be subjected to embossing. The photocurable resin layer is subjected to embossing, removed from the stamper and thereafter irradiated with light to cure the resin layer. The light used for curing includes high-energy ionization radiations and UV rays as described above. The photocurable resin layer maybe subjected almost simultaneously to embossing and exposure to light.

After curing, the finely embossed pattern may be provided if necessary with a reflective layer such as a metal-deposited layer and a layer of high-refractive material or a transparent protective layer for improving resistance to wearing and stain resistance. Further, when a reflective layer or a protective layer or the like is additionally formed on the finely embossed pattern-forming layer, an adhesive layer may further be formed thereon.

The transfer sheet prepared in this manner by forming the finely embossed pattern on the finely embossed pattern-forming layer and curing it is wound again as a roll stock and stored or conveyed.

Then, the transfer sheet having the finely embossed pattern formed thereon is delivered from the roll stock, and the transfer-receptive surface of a second transfer support is laid on the finely embossed pattern-forming layer, and the portion of the transfer sheet from which the hologram is to be transferred is melt and joined by heating and pressing from the substrate film side with a press roller or a press plate, and then the transfer sheet is removed, whereby the finely embossed pattern-forming layer having the finely embossed pattern thereon is transferred to the second support. The temperature and pressure for transfer are suitably regulated because these conditions are significantly varied depending not only on factors concerning the pressing method such as the press system (roll system, stamping system), pressing time or the like but also on factors such as the material and melting temperature of the support, the melting temperature of the heat-sensitive adhesive, the adhesion between the heat-sensitive adhesive and the support material or the like.

Thus, an optical article which is provided with a cured resin layer made of a cured product of the photocurable resin composition and having a surface structure with the finely embossed pattern of relief hologram can be obtained in this manner.

(Optical Article and Stamper)

According to the invention, an optical article which is provided with a cured resin layer made of a cured product of the photocurable resin composition and having a surface structure with finely embossed patterns having various optical functions can be produced by the same method as for the relief hologram or by its modified method if necessary.

Generally, the embossed pattern of a conventional hologram reproduced by embossing is formed such that the width (pitch) is about 500 to 1500 nm, and the depth to the width (depth/width) is not higher than about 1/3. As a matter of course, such embossed patterns can be reproduced according to the present invention, and further complicate and finely embossed patterns having higher optical functions wherein the width (pitch) of the embossed pattern is for example about 200 nm or less, or finely embossed patterns wherein the depth to the width (depth/width) is not less than 1/2 can be mass-produced accurately and successively by embossing because the finely embossed pattern-forming material can be sufficiently filled in the whole of the cavity of the stamper during pressing, the stamper upon removal does not cause the partial remaining on the plate, and collapse of the pattern hardly occurs after removal of the stamper.

The optical article produced by embossing the finely embossed pattern-forming material of the invention includes (1) relief holograms and diffraction gratings used for security purposes, which are attached for example to credit cards, ID cards, gift certificates, bank notes etc. (2) relief holograms and diffraction gratings used in graphic arts and designs, which are attached for example to amusement goods, gifts, packages, postcards, envelops, novelty goods etc., (3) optical elements regulating at least one of reflection, transmission, scattering, polarization, convergence and interference of whole rays and/or a light at a specific wavelength, for example, optical elements such as reflective plates, scattering plates, polarizing plates, lens, wavelength-selective elements, anti-glare plates, birefringence wavelength plates, and optical elements having a sub-wavelength structure, and (4) information-recording elements, for example information recording holograms, optical cards, optical disks etc.

The present invention can be applied to more complicate or accurate regulation of light than by the relief hologram or diffraction grating, but the present invention can also be applied to the relief hologram or diffraction grating thereby forming not only a merely bright hologram but also a relief hologram and diffraction grating having a complicate design.

According to the present invention, the finely embossed pattern can be formed with very high accuracy, so a finely embossed pattern to be given to an optical article is used as a mold, from which its complimentary embossed pattern can reproduced and then a resultant can be used as a stamper.

As described above, since the inorganic superfine particles are incorporated into the photocurable resin composition in the first aspect of the invention, it is possible to prevent the finely embossed pattern from rounding and collapsing due to the elasticity of the resin composition itself, during the process including a light exposure process and a deposition process after a finely embossed pattern is given by pressing a press stamper on a photocurable resin layer comprising the photocurable resin composition and the stamper is removed.

Accordingly, the press stamper can be used successively in the stamping process without being used in the light exposure process, to produce optical articles efficiently and successively.

Further, the photocurable resin composition in the first aspect is excellent in resistance to blocking by incorporating the inorganic superfine particles, and thus an intermediate laminate having the photocurable resin layer formed on a substrate film can be rolled, stored transiently, conveyed to another place and subjected to stamping.

When acrylic resin, urethane acrylate resin, polyester acrylate resin or an arbitrary mixture thereof is used as the main binder in the photocurable resin composition in the first aspect, the composition after curing is excellent in transparency, strength, resistance to wearing, heat resistance, water resistance, chemical resistance, adhesion to the substrate, flexibility and fitting to the flex, expansion and contraction of the substrate to sufficiently satisfy general performance required of the optical article, has sufficient abilities in film-forming property, plasticity and creep characteristics enough to form a film and endow it with an embossed pattern by a stamper, and can be used to reproduce finely embossed patterns very accurately in combination with the inorganic superfine particles. Accordingly, a surface structure of an optical article excellent in performance can be produced accurately, rapidly and successively by stamping.

Hereinafter, Examples I series in the first aspect of the invention are described.

EXAMPLE I SERIES

Example I-1

(1) Production of Binder Resin (A)

A 2L (liters) flask equipped with a condenser, a dropping funnel and a thermometer was charged with 40 g toluene and 40 g methyl ethyl ketone together with an azo-type polymerization initiator, and the reaction is carried out at a temperature of 100° C. for 8 hours while adding dropwise a mixture liquid of 20.8 g 2-hydroxymethyl methacrylate, 39.0 g methyl methacrylate, 45.0 g isobornyl methacrylate, 20 g toluene and 20 g methyl ethyl ketone via the dropping funnel, and then cooled it to room temperature. A mixture of 23.4 g 2-isocyanate ethyl methacrylate (Karenz MOI, Showa Denko K.K.), 20 g toluene and 20 g methyl ethyl ketone was added thereto and subjected to addition reaction in the presence of dibutyl-stannum laurate as the catalyst. By IR analysis of the reaction product, the disappearance of an absorption peak of the isocyanate was confirmed and the reaction was finished. The solids content of the resultant resin solution was 38.2% by weight, the polystyrene conversion molecular weight was 30,000, and the amount of carbon-carbon double bonds (C=C) introduced was 12.5%.

(2) Preparation of the Photocurable Resin Composition

The binder resin (A) and other components were mixed in the blending ratio shown below and diluted with methyl ethyl ketone to adjust the solids content concentration to 20% by weight, whereby the photocurable resin composition I-1 in Example 1 was prepared.

<Photocurable Resin Composition 1>
Binder resin (A) (solids content basis): 70 parts by weight
Multifunctional oligomer (dipentaerythritol hexaacrylate, KAYARAD DPHA (trade name), Nippon Kayaku Co., Ltd.): 30 parts by weight
Release agent (amino-modified reactive silicone oil, KF-860 (trade name), produced by Shin-Etsu Chemical Co., Ltd.): 5 parts by weight
Photopolymerization initiator (Irgacure 184 (trade name), produced by Ciba Specialty Chemicals K.K.): 5 parts by weight
Spherical colloidal silica (MEK-ST (trade name), produced by Nissan Chemical Industries, Ltd.) (solids content basis): 70 parts by weight Example I-2

The binder resin (A) produced in Example 1 and other components were mixed in the blending ratio shown below and diluted with methyl ethyl ketone to adjust the solids content concentration to 20% by weight, whereby the photocurable resin composition 2 in Example I-2 was prepared.

<Photocurable Resin Composition 2>
Binder resin (A) (solids content basis): 60 parts by weight
Urethane acrylate (SHIKOH UV-3520TL (trade name), produced by The Nippon Synthetic Chemical Industry, Co., Ltd.) (solids content basis): 30 parts by weight
Release agent (silicone resin, KF-7312 (trade name), produced by Shin-Etsu Chemical Co., Ltd.): 1 part by weight
Photopolymerization initiator 1 (Irgacure 907 (trade name), produced by Ciba Specialty Chemicals K.K.): 2 parts by weight
Photopolymerization initiator 2 (Irgacure 184 (trade name), produced by Ciba Specialty Chemicals K.K.): 3 parts by weight
Spherical colloidal silica (MEK-ST (trade name), produced by Nissan Chemical Industries, Ltd.) (solids content basis): 90 parts by weight Example I-3

The binder resin (A) produced in Example 1 and other components were mixed in the blending ratio shown below and diluted with methyl ethyl ketone to adjust the solids content concentration to 20% by weight, whereby the photocurable resin composition 3 in Example I-3 was prepared.

<Photocurable Resin Composition 3>
Binder resin (A) (solids content basis): 70 parts by weight
Polyester acrylate (ARONIX M-9050 (trade name), produced by Toagosei Chemical Industry, Co., Ltd.): 20 parts by weight
Release agent (amino-modified silicone resin, KF-8012 (trade name), produced by Shin-Etsu Chemical Co., Ltd.): 3 parts by weight
Monofunctional monomer (isobornyl methacrylate, SR-423 (trade name), produced by Sartomer Company): 10 parts by weight
Photopolymerization initiator (Irgacure 2959 (trade name), produced by Ciba Specialty Chemicals K.K.): 3 parts by weight
Aluminum coupling agent (ALCH-TR (trade name), produced by Kawaken Fine Chemical Co., Ltd.): 5 parts by weight
Spherical colloidal silica (MEK-ST (trade name), produced by Nissan Chemical Industries, Ltd.) (solids content basis): 80 parts by weight Example I-4

<Photocurable Resin Composition 4>
(1) Production of Binder Resin (B)

A 2L flask equipped with a condenser, a dropping funnel and a thermometer was charged with 40 g toluene and 40 g methyl ethyl ketone together with an azo-type polymerization initiator, and the reaction is carried out at a temperature of 100 to 110° C. for about 8 hours while adding dropwise a mixture liquid of 25.6 g 2-hydroxymethyl methacrylate, 36.0 g methyl methacrylate, 109.6 g isobornyl methacrylate, 20 g toluene and 20 g methyl ethyl ketone via the dropping funnel over about 2 hours, and then cooled it to room temperature.

A mixture of 28.8 g 2-isocyanate ethyl methacrylate (Karenz MOI, Showa Denko K.K.), 20 g toluene and 20 g methyl ethyl ketone was added thereto and subjected to addition reaction in the presence of dibutylstannum laurate as the catalyst. By IR analysis of the reaction product, the disappearance of an absorption peak of the isocyanate was confirmed and the reaction was finished. The solids content of the resultant resin solution was 37.0% by weight, the viscosity was 130 mPa (30° C.), the polystyrene conversion molecular weight was 60,000, and the amount of carbon-carbon double bonds (C=C) introduced was 12.8%.

(2) Preparation of the Photocurable Resin Composition

The binder resin (B) and other components were mixed in the blending ratio shown below and diluted with methyl ethyl ketone to adjust the solids content concentration to 20% by weight, whereby the photocurable resin composition 4 in Example I-4 was prepared.

<Photocurable Resin Composition 4>
Binder resin (B) (solids content basis): 60 parts by weight
Multifunctional oligomer (SHIKOH UV-1700B (trade name), produced by The Nippon Synthetic Chemical Industry, Co., Ltd.): 40 parts by weight
Release agent (silicone resin, X-21-3056 (trade name), produced by Shin-Etsu Chemical Co., Ltd.): 1 part by weight
Photopolymerization initiator (Irgacure 907 (trade name), produced by Ciba Specialty Chemicals K.K.) (solids content basis): 5 parts by weight
Spherical colloidal silica (MEK-ST (trade name), produced by Nissan Chemical Industries, Ltd.) (solids content basis): 60 parts by weight Example I-5

The binder resin (B) produced in Example I-4 and other components were mixed in the blending ratio shown below and diluted with methyl ethyl ketone to adjust the solids content concentration to 20% by weight, whereby the photocurable resin composition 5 in Example I-5 was prepared.

<Photocurable Resin Composition 5>
  Binder resin (B) (solids content basis): 70 parts by weight
  Release agent (silicone resin, KF-7312 (trade name), produced by Shin-Etsu Chemical Co., Ltd.): 1 part by weight
  Multifunctional oligomer (SR-399 (trade name), produced by Sartomer Company): 10 parts by weight
  Aluminum coupling agent (ALCH-TR (trade name), produced by Kawaken Fine Chemical Co., Ltd.): 5 parts by weight
  Photopolymerization initiator (Irgacure 907 (trade name), produced by Ciba Specialty Chemicals K.K.): 5 parts by weight
  Spherical colloidal silica (MEK-ST (trade name), produced by Nissan Chemical Industries, Ltd.) (solids content basis): 30 parts by weight Example I-6

The binder resin (B) produced in Example 4 and other components were mixed in the blending ratio shown below and diluted with methyl ethyl ketone to adjust the solids content concentration to 20% by weight, whereby the photocurable resin composition 6 in Example I-6 was prepared.

<Photocurable Resin Composition 6>
  Binder resin (B) (solids content basis): 30 parts by weight
  Non-polymerizable binder resin (DIANAL BR-85 (trade name), produced by Mitsubishi Rayon Co., Ltd.): 30 parts by weight
  Multifunctional monomer (dipentaerythritol hexaacrylate, KAYARAD DPHA (trade name), Nippon Kayaku Co., Ltd.): 30 parts by weight
  Release agent (amino-modified silicone resin, KF-8012 (trade name), produced by Shin-Etsu Chemical Co., Ltd.): 10 parts by weight
  Photopolymerization initiator (Irgacure 184 (trade name), produced by Ciba Specialty Chemicals K.K.): 5 parts by weight
  Spherical colloidal silica (MEK-ST (trade name), produced by Nissan Chemical Industries, Ltd.) (solids content basis): 60 parts by weight Example I-7

The photocurable resin composition 7 in Example I-7 was prepared in the same manner as in Example I-1 except that 10 parts by weight (solids content basis) of needle colloidal silica (IPA-ST-UP (trade name), produced by Nissan Chemical Industries, Ltd.) was used in place of 70 parts by weight of spherical colloidal silica in Example I-1.

Example I-8

The photocurable resin composition 8 in Example I-8 was prepared in the same manner as in Example I-2 except that 15 parts by weight (solids content basis) of needle colloidal silica (IPA-ST-UP (trade name), produced by Nissan Chemical Industries, Ltd.) was used in place of 90 parts by weight of spherical colloidal silica in Example I-2.

Example I-9

The photocurable resin composition 9 in Example I-9 was prepared in the same manner as in Example I-3 except that 10 parts by weight (solids content basis) of needle colloidal silica (IPA-ST-UP (trade name), produced by Nissan Chemical Industries, Ltd.) was used in place of 80 parts by weight of spherical colloidal silica in Example I-3.

Example I-10

The photocurable resin composition 10 in Example I-10 was prepared in the same manner as in Example I-4 except that 10 parts by weight (solids content basis) of needle colloidal silica (IPA-ST-UP (trade name), produced by Nissan Chemical Industries, Ltd.) was used in place of 60 parts by weight of spherical colloidal silica in Example I-4.

Example 11

The photocurable resin composition 11 in Example I-11 was prepared in the same manner as in Example I-5 except that 5 parts by weight (solids content basis) of needle colloidal silica (IPA-ST-UP (trade name), produced by Nissan Chemical Industries, Ltd.) was used in place of 30 parts by weight of spherical colloidal silica in Example I-5.

Example I-12

The photocurable resin composition 12 in Example I-12 was prepared in the same manner as in Example I-6 except that 10 parts by weight (solids content basis) of needle colloidal silica (IPA-ST-UP (trade name), produced by Nissan Chemical Industries, Ltd.) was used in place of 60 parts by weight of spherical colloidal silica in Example I-6.

Comparative Examples I-1 to I-6

The photocurable resin compositions I-1 to I-6 in the comparative examples were prepared in the same manner as in Examples I-1 to I-6 except that the colloidal silica was not incorporated.

Example I-13

(1) Preparation of a Label-Type Finely Embossed Pattern Sheet

Each of the photocurable resin compositions in the Examples and Comparative Examples was applied by a gravure coater onto an adhesion-facilitated surface of a polyethylene terephthalate film of 50 μm in thickness, one surface of which is treated to facilitate adhesion (Diafoil T600E, Diafoil Hoechst) and dried at 100° C. to evaporate the solvent, to form a reproducing photosensitive film having a dry film thickness of 2 g/m².

Then, a press stamper prepared from a mold previously produced by a laser light was arranged on the emboss roller in the reproducing unit, and the reproducing photosensitive film was set at the side of the paper feeder in the reproducing unit and heat-pressed at 150° C. to form a finely embossed pattern thereon. Then, the reproducing photosensitive film was photoset by irradiation with UV rays generated from a mercury lamp, and subsequently aluminum was vapor-deposited thereon by vacuum deposition to give a reflective finely embossed pattern sheet.

(2) Evaluation of the Label-Type Finely Embossed Pattern Sheet

An intermediate product obtained during preparation of the label-type finely embossed pattern sheet and the finished label-type finely embossed pattern sheet were evaluated as follows. The results are shown in Table 1.

<Evaluation Items>

(1) Resistance to Blocking

The reproducing photosensitive film before embossing was stored in the form of a roll at room temperature in the dark for 1 month, and the blocking of the surface was observed with naked eyes and evaluated according to the following criteria:

◎: Good.

○: A trace of melt resin slightly remains on the surface but does not adhere thereto.

x: The film is adherent, and resin on the surface is melted and roughened.

(2) Shaping

The finely embossed pattern embossed by a press stamper was examined by comparing its images from AFM (atomic force microscopy) and evaluated according to the following criteria:

◎: The shape is accurately reproduced even if the time of heating press with the stamper is reduced by half.

○: Good, that is, the shape on the press stamper is accurately reproduced.

x: Poor, that is, the shape is not accurately reproduced and shows "sagging" causing its edges to be inaccurate and round.

(3) Form Retention

The finished product was obtained by the process comprising the process of irradiating the finely embossed pattern embossed by a press stamper with UV rays and the subsequent processes, and this finished product was examined by comparing its images from AFM and evaluated according to the following criteria:

○: Good, that is, the shape of the press stamper is accurately reproduced after the subsequent processes.

x: Poor, that is, the shape is not accurately reproduced and shows "sagging" causing its edges to be inaccurate and round.

(4) Heat Resistance

The finished product was left in an environment at 100° C. for 2 hours, then observed and evaluated according to the following criteria:

○: Good, that is, there is no defect.

x: Poor, that is, there are defects such as discoloration and deformation.

(5) Deposition Suitability (Cellophane Tape Peeling Test)

An aluminum layer was deposited by vacuum deposition on the surface having the finely embossed pattern formed thereon, and the deposited layer was provided with 11 vertical lines×11 horizontal lines by cutting with a cutter, thus forming 100 squares in the form of a chessboard. A cellophane tape was stuck strongly to the deposited layer and then removed all at once therefrom, and the number of squares remaining on the film was counted, and the adhesion was evaluated according to the following criteria:

○: Good, that is, the number of remaining squares was 95 or more.

x: Poor, that is, the number of remaining squares was 94 or less.

TABLE 1

| Composition | Examples | | | | | | | | | | | | Comparative Examples | | | | | |
| | Spherical silica | | | | | | Needle silica | | | | | | | | | | | |
| No. | 1 | 2 | 3 | 4 | 5 | 6 | 7 | 8 | 9 | 10 | 11 | 12 | 1 | 2 | 3 | 4 | 5 | 6 |
| Resistance to Blocking | ◎ | ○ | ◎ | ○ | ◎ | ◎ | ◎ | ◎ | ◎ | ◎ | ◎ | ◎ | X | X | X | X | ○ | X |
| Shaping | ○ | ○ | ○ | ○ | ○ | ○ | ◎ | ◎ | ◎ | ◎ | ◎ | ◎ | X | X | X | X | ○ | ○ |
| Form retention | ○ | ○ | ○ | ○ | ○ | ○ | ○ | ○ | ○ | ○ | ○ | ○ | X | X | X | X | X | X |
| Heat resistance | ○ | ○ | ○ | ○ | ○ | ○ | ○ | ○ | ○ | ○ | ○ | ○ | ○ | ○ | ○ | ○ | ○ | ○ |
| Deposition suitability | ○ | ○ | ○ | ○ | ○ | ○ | ○ | ○ | ○ | ○ | ○ | ○ | ○ | ○ | ○ | ○ | ○ | ○ |

Example I-14

(1) Preparation of the Finely Embossed Pattern Transfer Sheet

A polyethylene terephthalate film of 25 μm in thickness (Lumilar T60(trade name), Toray Industries, Inc.) was coated by a gravure coating with a releasable varnish (Hakuri Nisu 45-3 (trade name), a product of Showa Ink Kogyo Co., Ltd.) and dried at 100° C. to evaporate the solvent, to form a release layer having a dry film thickness of 1 g/m². The surface of this releasable layer was coated by a gravure coater with each of the photocurable resin compositions in the Examples and Comparative Examples and dried at 100° C. to evaporate the solvent, to form a reproducing photosensitive film having a dry film thickness of 2 g/m².

Then, a press stamper prepared from a mold previously produced by a laser light was arranged on the emboss roller in the reproducing unit, and the reproducing photosensitive film was set at the side of the paper feeder in the reproducing unit and heat-pressed at 150° C. to form a finely embossed pattern thereon. Then, the reproducing photosensitive film was photoset by irradiation with UV rays generated from a mercury lamp, and subsequently aluminum was vapor-deposited thereon by vacuum deposition to give a reflective relief hologram. The surface of the hologram was coated by gravure coating with an acrylic heat-sensitive adhesive and dried at 100° C. to evaporate the solvent, to form an adhesive layer having a dry film thickness of 1 g/m² thereon, whereby a finely embossed pattern-transfer sheet was obtained. From this transfer sheet, the relief hologram can be transferred to the surfaces of various articles, to form printed matter or displays showing three-dimensional images.

(2) Evaluation of the Finely Embossed Pattern-Transfer Sheet

An intermediate product obtained during preparation of the finely embossed pattern-transfer sheet and the finished finely embossed pattern-transfer sheet were evaluated as follows. The results are shown in Table 2.

<Evaluation Items>

(1) Resistance to Blocking

Evaluation was conducted in the same manner as in Example I-13. That is, the reproducing photosensitive film before embossing was stored in the form of a roll at room temperature in the dark for 1 month, and the blocking of the surface was observed with naked eyes and evaluated according to the following criteria:

⊚: Good.

○: A trace of melt resin slightly remains on the surface but does not adhere thereto.

x: The film is adherent, and resin on the surface is melted and roughened.

(2) Shaping

Evaluation was conducted in the same manner as in Example I-13. That is, the finely embossed pattern embossed by a press stamper was examined by comparing its images from AFM (atomic force microscopy) and evaluated according to the following criteria:

(5) Resistance to Wearing

The surface of the product was rubbed 10 times with steel wool #0000, and the surface was observed and evaluated according to the following criteria:

○: Good, that is, there is no change in the surface.

x: Poor, that is, the surface is hurt.

(6) Transfer Sheet Suitability

An aluminum layer was deposited by vacuum deposition on the surface having the finely embossed pattern formed thereon, and a heat-sealing acrylic adhesive was applied thereon, and the resultant sheet was transferred onto a card made of polyvinyl chloride, and the cuttability of the layers to be transferred when used as a transfer sheet was evaluated according to the following criteria:

○: Good, that is, the shape is accurately transferred to the card.

x: Poor, that is, the layer to be transferred is partially remains or breaks.

TABLE 2

| Composition | Examples | | | | | | | | | | | | Comparative Examples | | | | | |
| --- | --- | --- | --- | --- | --- | --- | --- | --- | --- | --- | --- | --- | --- | --- | --- | --- | --- | --- |
| | Spherical silica | | | | | | Needle silica | | | | | | | | | | | |
| No. | 1 | 2 | 3 | 4 | 5 | 6 | 7 | 8 | 9 | 10 | 11 | 12 | 1 | 2 | 3 | 4 | 5 | 6 |
| Resistance To blocking | ⊚ | ○ | ⊚ | ○ | ⊚ | ⊚ | ⊚ | ⊚ | ⊚ | ⊚ | ⊚ | ⊚ | x | x | x | x | ○ | x |
| Shaping | ○ | ○ | ○ | ○ | ○ | ○ | ⊚ | ⊚ | ⊚ | ⊚ | ⊚ | ⊚ | x | x | x | x | ○ | ○ |
| Form retention | ○ | ○ | ○ | ○ | ○ | ○ | ○ | ○ | ○ | ○ | ○ | ○ | x | x | x | x | x | x |
| Heat resistance | ○ | ○ | ○ | ○ | ○ | ○ | ○ | ○ | ○ | ○ | ○ | ○ | ○ | ○ | ○ | ○ | ○ | ○ |
| Resistance to Wearing | ○ | ○ | ○ | ○ | ○ | ○ | ○ | ○ | ○ | ○ | ○ | ○ | ○ | ○ | ○ | ○ | ○ | ○ |
| Transfer sheet Suitability | ○ | ○ | ○ | ○ | ○ | ○ | ○ | ○ | ○ | ○ | ○ | ○ | ○ | ○ | ○ | ○ | ○ | ○ |

⊚: The shape is accurately reproduced even if the time of heating press with the stamper is reduced by half.

○: Good, that is, the shape on the press stamper is accurately reproduced.

x: Poor, that is, the shape is not accurately reproduced and shows "sagging" causing its edges to be inaccurate and round.

(3) Form Retention

Evaluation was conducted in the same manner as in Example I-13. That is, the finished product was obtained by the process comprising the process of irradiating the finely embossed pattern embossed by a press stamper with UV rays and the subsequent processes, and this finished product was examined by comparing its images from AFM and evaluated according to the following criteria:

○: Good, that is, the shape of the press stamper is accurately reproduced after the subsequent processes.

x: Poor, that is, the shape is not accurately reproduced and shows "sagging" causing its edges to be inaccurate and round.

(4) Heat Resistance

Evaluation was conducted in the same manner as in Example I-13. That is, the finished product was left in an environment at 100° C. for 2 hours, then observed and evaluated according to the following criteria:

○: Good, that is, there is no defect.

x: Poor, that is, there are defects such as discoloration and deformation.

Second Aspect of the Invention

The photocurable resin composition in the second aspect of the invention comprises, as essential components, (C) a binder resin having photopolymerizable functional groups and (D) hydrophobic fine silica particles.

If necessary, the photocurable resin composition in the second aspect may comprise other components such as a non-polymerizable binder resin, a monomer or oligomer having a photopolymerizable group, a release agent, an organometallic coupling agent, a photopolymerization initiator and a polymerization inhibitor.

(Binder Component)

The binder resin (D) having photopolymerizable functional groups used in the photocurable resin composition in the second aspect may be the same as the binder resin (A) having photopolymerizable functional groups used in the photocurable resin composition in the first aspect.

In the second aspect too, a part of the binder resin (D) is preferably a polymer component whose polystyrene conversion molecular weight is in the range of 2,000 to 600,000, and preferably the binder resin (D) having a molecular weight in this range accounts for at least 20% by weight of the total binder resin.

The binder resin (D) is preferably acrylic resin, urethane acrylate resin and polyester acrylate resin, among which urethane-modified acrylic resin, urethane acrylate and polyester acrylate, particularly urethane-modified acrylic resin of formula 1, are more preferable similarly to the first aspect.

(Hydrophobic Fine Silica Particles)

Since the photocurable resin composition in the second aspect of the invention contains the hydrophobic fine silica particles (D), this composition has a lower softening initiation temperature than that of the composition not containing the hydrophobic fine silica particles or the composition containing hydrophilic fine silica particles, and is thus excellent in low-temperature processability, so that the finely embossed pattern on the stamper can be reproduced easily and accurately through embossing at a relatively low temperature by, for example, heat pressing a stamper in an emboss roller etc. at the time of embossing for reproduction of a hologram or the like. This photocurable resin composition can easily enter into the cavity of the stamper to accurately reproduce the finely embossed pattern, probably because the resin in the photocurable resin composition is melted by heating to lower its viscosity and because the photocurable resin composition containing the hydrophobic fine silica particles (D) is pressed thus undergoing shearing stress to lower the viscosity of the photocurable resin composition.

In the present invention, the reduction in the softening initiation temperature of the photocurable resin composition is the reduction in the softening initiation temperature thereof as compared with the composition not containing the fine hydrophobic silica particles, which is determined from dynamic storage modulus of elasticity measured by a method of measuring dynamic viscoelasticity. The reduction in the softening initiation temperature is desirably 2° C. or more.

The method of measuring dynamic viscoelasticity used in evaluation of the reduction in the softening initiation temperature is conducted as follows: That is, after a resin material is dried at room temperature to evaporate the solvent and then vacuum-dried at room temperature. After drying, the resin material is measured by means of a dynamic viscoelasticity measuring meter. As the measuring meter, for example Rheogel-E400 (UBM Co., Ltd.) can be used. The dried sample is measured after being charged into a slit (gap, 0.8 mm; size, 20 mm×20 mm) of a liquid shearing jig in the measuring device. The measurement conditions are set such that the basic measurement frequency is 10 Hz, the distortion waveform is a sine wave, the distortion regulation is 0.5 μm, the temperature range is from room temperature to 150° C., and the increasing temperature is 3° C./min. The temperature at which the measured dynamic storage modulus of elasticity is made lower by 3% or more than at 30° C. is defined as the softening initiation temperature.

By incorporating the hydrophobic fine silica particles (D) into the photocurable resin composition, the releasability of the photocurable resin composition is improved, and when the stamper pressed against the photocurable resin layer is removed, the resin composition adheres hardly to the internal surface of the cavity of the stamper so that after the stamper is removed before curing from an intermediate laminate comprising a layer of the photocurable resin composition in the second aspect formed on a flexible support such as a substrate film, the intermediate laminate can be exposed to light, or after the stamper is removed, the intermediate laminate can be rolled or piled, stored transiently, and transferred to another place where it can be subjected to stamping. Accordingly, when this photocurable resin composition is used, a high speed of forming finely embossed patterns can be achieved, and further the same effect achieved by exposure to light after removal of the stamper in the first aspect can also be obtained in the second aspect.

The hydrophobic fine silica particles (D) are incorporated into the photocurable resin composition, whereby the finely embossed pattern formed by embossing a layer of the photocurable resin composition and then curing the layer by exposure to light can be endowed with resistance to wearing, to give e.g. a durable optical article.

The hydrophobic fine silica particles refer to fine silica particles rendered hydrophobic by treatment of silanol groups (—SiOH) on the surface of the fine silica particles. That is, the general fine silica particles are hydrophilic because of a large number of silanol groups present on the surface, and the hydrophobic fine silica particles refer to those rendered hydrophobic by reducing the silanol groups through reaction. For example, when silanol groups on the surface are treated (reacted) with dimethyl dichlorosilane etc., methyl groups are substituted for the silanol groups, and further the product forms siloxane linkages to make the surface hydrophobic. The hydrophobic fine silica particles include commercial products such as Aerosil R976 (trade name, produced by Nippon Aerosil Ltd.).

The primary particle diameter of the hydrophobic fine silica particles is preferably 3 to 100 nm. A particle size outside of this range is not preferable because if the primary particle diameter is less than 3 nm, the silica particles are inferior in the effect of reducing the softening initiation temperature, while if the diameter is greater than 100 nm, the transparency of the resin is lowered to deteriorate optical characteristics required of the optical article.

The content of the hydrophobic fine silica particles (D) is desirably 3 to 40% by weight relative to the total solids content. A content outside of this range is not preferable because if the content of the hydrophobic fine silica particles is less than 3% by weight, blocking easily occurs, while if the content is greater than 40% by weight, brittleness is significant to deteriorate film-forming properties.

(Other Components)

Like the photocurable resin composition in the first aspect, the photocurable resin composition in the second aspect may comprise other components such as a non-polymerizable binder resin, a monomer and/or an oligomer, a release agent, an organometallic coupling agent, a photopolymerization initiator, a polymerization inhibitor and a solvent as necessary.

The monomer or oligomer in the second aspect of the invention is incorporated in a ratio of preferably 5 to 50% by weight particularly preferably 5 to 35% by weight of the total solids content of the photocurable resin composition.

(Method, Sheet and Transfer Sheet for Formation of Finely Embossed Patterns)

Like the photocurable resin composition in the first aspect, the photocurable resin composition in the second aspect can also be used preferably as a material forming finely embossed patterns, particularly a material forming finely embossed patterns on optical articles. That is, the photocurable resin composition in the second aspect is applied onto the surface of a support such as a substrate film, dried if necessary to form a layer of the finely embossed pattern-forming material (finely embossed pattern-forming layer) to prepare an embossed pattern receptor, subjected to embossing by pressing a stamper onto the surface of the finely embossed pattern-forming layer of the embossed pattern receptor, to endow a finely embossed pattern thereon, and thereafter the finely embossed pattern-forming layer is cured by exposure to light, whereby the finely embossed pattern can be formed.

Further, the photocurable resin composition in the second aspect is used to prepare a finely embossed pattern-forming sheet and a finely embossed pattern transfer sheet in the same manner as for the photocurable resin composition in the first aspect, and these can be utilized to form finely embossed patterns.

In the method described above, the photocurable resin composition is applied onto the surface of a support such as a substrate film etc. to form a layer of the photocurable resin composition, and then the surface of the photocurable resin layer is subjected almost simultaneously to embossing and exposure to light, whereby the cured resin layer having the finely embossed pattern formed thereon can be produced, or the photocurable resin composition is applied onto the surface of a support such as a substrate film etc., to form a layer of the photocurable resin composition, and the surface of the photocurable resin layer is subjected to embossing, and after the stamper is removed, the surface of the layer is exposed to light, whereby the cured resin layer having the finely embossed pattern formed thereon can be produced.

Further, the finely embossed pattern-forming sheet in the second aspect is also superior in resistance to blocking, and thus the finely embossed pattern-forming sheet stored previously in the state of a roll stock is unrolled from the roll stock and subjected to embossing and light exposure almost simultaneously, or after the stamper used in embossing is removed, the sheet is exposed to light, whereby the cured resin layer having the finely embossed pattern formed thereon can be produced.

In particular, when an optical article is produced, the photocurable resin composition is applied onto the surface of a support such as a substrate film etc. to form a finely embossed pattern-forming layer, and then the surface of this layer is subjected simultaneously to embossing and exposure to radiations such as UV rays, or subjected to embossing and then to light exposure after removal of the stamper, whereby the embossed pattern-forming layer is cured, and then a metal-deposited layer or a layer having refractive index different from that of the finely embossed pattern-forming layer is laminated on the surface having the finely embossed pattern formed thereon, whereby an optical article can be obtained.

According to the second aspect of the invention, the hydrophobic fine silica particles (D) are incorporated into the binder resin (C) having photopolymerizable functional groups thereby lowering the softening initiation temperature of the photocurable resin composition and improving releasability and resistance to blocking, and therefore the accurate finely embossed pattern can be mass-produced rapidly and successively at a relatively low temperature.

(Optical Article and Stamper)

When the photocurable resin composition in the second aspect is used, an optical article provided with a cured resin layer which is made of a cured product of the photocurable resin composition and has a surface structure with finely embossed patterns having various optical functions, particularly complicate and finely embossed patterns having higher optical functions than conventional can be accurately and successively mass-produced.

Further, when the photocurable resin composition in the second aspect is used, a stamper for reproducing a finely embossed pattern on an optical article can be produced similarly to the first aspect.

As described above, the hydrophobic fine silica particles are incorporated into the photocurable resin composition in the second aspect of the invention thereby lowering the softening initiation temperature and achieving excellent low-temperature processability.

Accordingly, finely embossed patterns can be formed accurately at a relatively low temperature by embossing the photocurable resin composition in the second aspect.

Further, the photocurable resin composition in the second aspect is superior in resistance to blocking by incorporation of the inorganic fine particles, and thus an intermediate laminate having the photocurable resin layer formed on a substrate film can be rolled, stored transiently, conveyed to another place and subjected to stamping.

When acrylic resin, urethane acrylate resin, polyester acrylate resin or an arbitrary mixture thereof is used as the main binder in the photocurable resin composition in the second aspect, the composition after curing is excellent in transparency, strength, resistance to wearing, heat resistance, water resistance, chemical resistance, adhesion to the substrate, flexibility and fitting to the flex, expansion and contraction of the substrate to sufficiently satisfy general performance required of the optical article, has sufficient abilities in film-forming property, plasticity and creep characteristics enough to form a film and endow it with an embossed pattern by a stamper, and can be used to reproduce finely embossed patterns very accurately at a relatively low temperature in combination with the hydrophobic fine silica particles. Accordingly, a surface structure of an optical article excellent in performance can be produced accurately, rapidly and successively by stamping.

Hereinafter, Examples II series in the second aspect of the invention are described.

EXAMPLE II SERIES

Example II-1

(1) Synthesis of Reactive Acrylic Resin (Middle-Molecular-Weight Type)

A 2 L four-necked flask equipped with a condenser, a dropping funnel and a thermometer was charged with 40 g toluene and 40 g methyl ethyl ketone together with an azo-type polymerization initiator, and the reaction was carried out at a temperature of 100 to 110° C. for 8 hours while adding dropwise a mixture of 22.4 g 2-hydroxyethyl methacrylate, 53.4 g methyl methacrylate, 7.4 g methacrylic acid, 13.9 g isobornyl methacrylate, 30 g toluene and 20 g methyl ethyl ketone via the dropping funnel over about 2 hours, and then cooling to room temperature. A mixture liquid of 27.8 g 2-isocyanate ethyl methacrylate (Karenz MOI, Showa Denko K.K.), 20 g toluene and 20 g methyl ethyl ketone was added thereto and subjected to addition reaction in the presence of dibutylstannum laurate as the catalyst. By IR analysis of the reaction product, the disappearance of an absorption peak at 2200 $cm^{-1}$ was confirmed and there action was finished. The solids content in the resin solution of the resultant reactive acrylic resin was 44.2% by weight, the polystyrene conversion weight average molecular weight was 22000, and the amount of reactive carbon-carbon double bonds introduced was 12.8 mol %.

(2) Preparation of Fine Silica Particle-Free Photocurable Resin Compositions (A-1, B-1)

The following two compounding ingredients using the reactive acrylic resin obtained in the above process were diluted with methyl ethyl ketone to adjust the solids content concentration to 40% by weight respectively, to give photocurable resin compositions A-1 and B-1.

<Compounding Ingredients in the Photocurable Resin Composition A-1>
Resin solution of the reactive acrylic resin in the process 1 above (solids content basis): 75 parts by weight
 Multifunctional urethane acrylate (SHIKOHUV-1700B (tradename), molecular weight about 2000, produced by The Nippon Synthetic Chemical Industry, Co., Ltd.): 25 parts by weight Trimethyl siloxy silicic acid-containing methyl polysiloxane (X-21-5766 (trade name), produced by Shin-Etsu Chemical Co., Ltd.): 1 part by weight Photopolymerization initiator (Irgacure 907 (trade name), produced by Ciba Specialty Chemicals K.K.): 4 parts by weight Methyl ethyl ketone (added so as to adjust the solids content of the composition to 40% by weight)

<Compounding Ingredients in the Photocurable Resin Composition B-1>

Resin solution of the reactive acrylic resin in the process 1 above (solids content basis): 80 parts by weight Multifunctional urethane acrylate (SHIKOHUV-1700B (tradename) produced by The Nippon Synthetic Chemical Industry, Co., Ltd.): 20 parts by weight Trimethyl siloxy silicic acid-containing methyl polysiloxane (X-21-5766 (trade name) produced by Shin-Etsu Chemical Co., Ltd.): 1 part by weight Photopolymerization initiator (Irgacure 907 (trade name) produced by Ciba Specialty Chemicals K. K.): 4 parts by weight Methyl ethyl ketone (added so as to adjust the solids content of the composition to 40% by weight)

(3) Preparation of Fine Silica Particle-Containing Photocurable Resin Compositions (A-2 to A-5 and B-2 to B-5)

The following fine silica particles were dispersed by zirconia beads in the photocurable resin compositions A-1 and B-1 prepared in the process 2 above, whereby the following photocurable resin compositions having various fine silica particles dispersed therein were obtained.

<Preparation of Photocurable Resin Compositions A-2 and B-2>

To the photocurable resin compositions A-1 and B-1, hydrophilic fine silica particles (Aerosil 200 (trade name) from Nippon Aerosil Ltd.) in an amount of 5% by weight of the solids content of the compositions were added, and these were mixed.

<Preparation of Photocurable Resin Compositions A-3 and B-3>

To the photocurable resin compositions A-1 and B-1, hydrophilic fine silica particles (Aerosil 200 (trade name) from Nippon Aerosil Ltd.) in an amount of 10% by weight of the solids content of the compositions were added, and these were mixed.

<Preparation of Photocurable Resin Compositions A-4 and B-4>

To the photocurable resin compositions A-1 and B-1, hydrophobic fine silica particles (Aerosil R976 (trade name) from Nippon Aerosil Ltd.) in an amount of 5% by weight of the solids content of the compositions were added, and these were mixed.

<Preparation of Photocurable Resin Compositions A-5 and B-5>

To the photocurable resin compositions A-1 and B-1, hydrophobic fine silica particles (Aerosil R976 (trade name) from Nippon Aerosil Ltd.) in an amount of 10% by weight of the solids content of the compositions were added, and these were mixed.

(4) Preparation of Reproducing Films

Each photocurable resin composition prepared in the processes 2 and 3 was applied by means of a bar coater onto an adhesion-facilitated surface of a polyethylene terephthalate film of 50 μm in thickness, one surface of which is treated to facilitate adhesion (Lumilar 50T85S (trade name) from Toray Industries, Inc.), and dried at 100° C. such that the thickness of the film after drying was 2 g/m$^2$, to give reproducing films A-1, A-2, A-3, A-4, A-5, B-1, B-2, B-3, B-4 and B-5. Each film was not sticky at ordinary temperature without any problem in transparency.

(5) Blocking Test

The reproducing films A-1, A-2, A-3, A-4, and A-5 prepared in process 4 above were subjected to loading at 5 kg/cm$^2$ on a blocking tester, and then kept for 24 hours in an environment at 30° C. Each reproducing film was taken just after stored for 24 hours, and the roughness of the film surface was confirmed. Table 3 shows the results where a film having a transparent, unchanged surface was evaluated as ○, a film which was opaque in the portion subjected to loading as Δ, and a film confirmed to have traces on the front side in which resin was dissolved at a portion subjected to loading or to have roughness even at a portion not subjected to loading as x.

TABLE 3

| A-1 | X |
|---|---|
| A-2 | Δ |
| A-3 | ○ |
| A-4 | ○ |
| A-5 | ○ |

As compared with the silica-free photocurable resin composition, the silica-containing compositions did not cause blocking on the resulting reproducing films, to give a good film surface. Further, 5% hydrophilic fine silica particles generated slight blocking, but addition of 5% hydrophobic fine silica particles did not cause blocking.

(6) Measurement of the Softening Temperatures of the Photocurable Resin Compositions In a dynamic viscoelasticity measuring device, the photocurable resin compositions B-1, B-2, B-3, B-4 and B-5 were softened once by heating at 60° C. and then set in a measuring jig. As described above, the measurement conditions were set such that the basic measurement frequency was 10 Hz, the distortion waveform was a sine wave, the distortion regulation was 0.5 μm, the temperature range was from room temperature to 150° C., and the increasing temperature was 3° C./min. The softening initiation temperatures thus determined are shown in Table 4 below.

TABLE 4

| B-1 | 60° C. |
|---|---|
| B-2 | 62° C. |
| B-3 | 68° C. |
| B-4 | 56° C. |
| B-5 | 50° C. |

According to Table 4, it can be seen that as the amount of the hydrophilic silica is increased, the softening initiation temperature is increased, while as the amount of the hydrophobic silica is increased, the softening initiation temperature is decreased to indicate more excellent low-temperature processability.

(7) Preparation of Finely Embossed Pattern Sheets

A press stamper having a finely embossed pattern formed thereon was attached to the emboss roller in the reproducing unit, and the reproducing film was set in the reproducing unit and provided with a finely embossed pattern by heat pressing. The heating conditions are the following conditions 1 to 3:

(Condition 1) While the surface temperature of the press stamper was set at 150° C., pressing was carried out at a predetermined rate.

(Condition 2) While the surface temperature of the press stamper was set at 130° C., pressing was carried out at a predetermined rate.

(Condition 3) While the surface temperature of the press stamper was set at 150° C., pressing was carried out at a rate twice as high as the rate of the above (condition 1). That is, the time of contacting the film with the press stamper was reduced by half.

After pressing, the film was removed from the press stamper and cured by irradiation with UV rays.

(8) Observation of the Shape of the Finely Embossed Pattern

The surface shape of the finely embossed pattern sheet and the height of embossed portions were evaluated by comparing tapping-mode images in AFM (atomic force microscopy). The measurement device used in this measurement is Nano Scope IIIa type from Digital Instruments Ltd., and measurement was carried out in the scanning range of 10 μm×10 μm at a scanning rate of 0.5 Hz. An image of the surface shape was evaluated with naked eyes, and taking the height of embossed portions into consideration, a sheet having embossed portions of regulated shape was expressed as ○, and a sheet having ground edges of embossed portions was expressed as x. "Height of Embossed Portions", that is, the distance between the concave and convex portions was also determined. These results are shown in Table 5 below.

TABLE 5

| | Height of Embossed Portions (nm) | | | Shape Evaluation (Visual Observation) | | |
|---|---|---|---|---|---|---|
| | Condition 1 | Condition 2 | Condition 3 | Condition 1 | Condition 2 | Condition 3 |
| B-1 | 82 | 80 | 61 | ○ | ○ | X |
| B-2 | 80 | 77 | 33 | ○ | ○ | X |
| B-3 | 84 | 46 | 21 | ○ | X | X |
| B-4 | 86 | 84 | 76 | ○ | ○ | ○ |
| B-5 | 82 | 75 | 72 | ○ | ○ | ○ |

From Table 5, it can be seen that use of the hydrophilic fine silica particles in the composition has the following inconvenience: Addition of the hydrophilic fine silica particles in a large amount causes the edges of embossed portions to be round at a relatively low temperature of 130° C. in embossing, and when the time of contact with the press stamper in embossing is 1/2 (that is, the line speed is doubled), the shape of the embossed portions is made round. However, the compositions using the hydrophobic fine silica particles are free of such inconvenience.

Example II-2

(1) Synthesis of Reactive Acrylic Resin (High-Molecular-Weight Type)

A 2 L four-necked flask equipped with a condenser, a dropping funnel and a thermometer was charged with 80 g toluene and 40 g methyl ethyl ketone together with an azo-type polymerization initiator, and the reaction was carried out for 8 hours while adding dropwise a mixture of 45.0 g 2-hydroxyethyl methacrylate, 22.5 g methyl methacrylate, 14.0 g isobornyl methacrylate, toluene and methyl ethyl ketone through the dropping funnel over about 2 hours. A mixture liquid of 50.0 g of 2-isocyanate ethyl methacrylate (Karenz MOI, Showa Denko K.K.), toluene and methyl ethyl ketone was added thereto and subjected to addition reaction in the presence of dibutylstannum laurate as the catalyst. By IR analysis of the reaction product, the disappearance of an absorption peak at 2200 cm$^{-1}$ was confirmed and the reaction was finished. The solids content of the resin solution of the resultant reactive acrylic resin was 25.8% by weight, the polystyrene conversion weight average molecular weight was 213000, and the amount of reactive carbon-carbon double bonds introduced was 11.2 mol %.

(2) Preparation of Photocurable Resin Composition (C-1)

Using the reactive acrylic resin obtained in the above process, the photocurable resin composition C-1 comprising the following compounding ingredients was prepared.

<Compounding Ingredients in the Photocurable Resin Composition C-1>

Resin solution of the reactive acrylic resin in the process 1 above (solids content basis): 75 parts by weight Multifunctional urethane acrylate (SHIKOHUV-1700B (tradename), molecular weight about 2000, produced by The Nippon Synthetic Chemical Industry, Co., Ltd.): 25 parts by weight Trimethyl siloxy silicic acid-containing methyl polysiloxane (X-21-5766 (trade name), produced by Shin-Etsu Chemical Co., Ltd.): 1 part by weight Photopolymerization initiator (Irgacure 907 (trade name), produced by Ciba Specialty Chemicals K. K.): 5 parts by weight (3) Preparation of Photocurable Resin Compositions C-2 and C-3

To the photocurable resin composition C-1 prepared in process 2 above, hydrophobic fine silica particles (Aerosil R976 (trade name) from Nippon Aerosil Ltd.) in an amount of 5% by weight of the solids content of the composition were added, and these were mixed, to give the photocurable resin composition C-2.

To the photocurable resin composition C-1 prepared in process 2 above, hydrophobic fine silica particles (Aerosil R976 (trade name) from Nippon Aerosil Ltd.) in an amount of 10% by weight of the solids content of the composition were added, and these were mixed, to give the photocurable resin composition C-3.

(4) Preparation of Reproducing Films, Preparation of Finely Embossed Pattern Sheets, and Observation of the shape of the Finely Embossed Patterns Using the photocurable resin compositions C-1, C-2 and C-3, reproducing films were prepared in the same manner as in Example II-1 (4).

Using the resultant reproducing films, 3 kinds of finely embossed pattern sheets were prepared under the conditions 1, 2 and 3 in the same manner as in Example II-1 (7).

The resultant finely embossed pattern sheets were observed for their finely embossed patterns in the same manner as in Example II-1 (8). A sheet wherein the edges of embossed portions could be sufficiently reproduced without particularly round edges was evaluated as ◉. The evaluation results are shown in Table 6 below.

TABLE 6

| | Height of Embossed Portions (nm) | | | Shape Evaluation (Visual Check) | | |
|---|---|---|---|---|---|---|
| | Condition 1 | Condition 2 | Condition 3 | Condition 1 | Condition 2 | Condition 3 |
| C-1 | 91 | 50 | 44 | ○ | X | X |
| C-2 | 90 | 86 | 87 | ◎ | ◎ | ○ |
| C-3 | 89 | 86 | 84 | ◎ | ○ | ○ |

As can be seen from Table 6, the compositions using the hydrophobic fine silica particles are excellent in reproducibility of embossed patterns. Further, the compositions in Example II-2 using the high-molecular-weight binder resin can reproduce finer embossed patterns with further excellent form retention than by the compositions in Example II-1 shown in Table 5.

Third Aspect of the Invention

The photocurable resin composition in the third aspect of the invention comprises, as essential components, (E) a binder resin containing acrylic resin and urethane acrylate resin and/or polyester acrylate resin having photopolymerizable functional groups and (F) an organometallic coupling agent.

If necessary, the photocurable resin composition in the third aspect may comprise other components such as a non-polymerizable binder resin, a monomer or oligomer having a photopolymerizable functional group, a release agent, a photopolymerization initiator and a polymerization inhibitor as necessary.

(Binder Component)

As the binder component in the third aspect of the invention, acrylic resin and urethane acrylate resin and/or polyester acrylate resin having photopolymerizable functional groups are used in combination.

The acrylic resin contained in the binder resin (E) is necessary for demonstrating the transparency and strength of the optical material and for endowing thermoplasticity in forming finely embossed patterns by heat pressing.

As the acrylic resin used in the third aspect, any polymers obtained by polymerizing general (meth)acrylate monomers or any polymers obtained by copolymerizing (meth)acrylate monomers with vinyl monomers can be used. For example, the acrylic resin includes, but is not limited to, polymers obtained by polymerizing (meth)acrylic acid, methyl (meth) acrylate, ethyl (meth)acrylate, butyl (meth)acrylate, 2-hydroxyethyl (meth)acrylate, N-methylol (meth)acrylamide, 2-hydroxypropyl (meth)acrylate, 2-hydroxybutyl (meth) acrylate, dimethyl acrylamide, dimethyl aminoethyl (meth) acrylate etc.

For forming finely embossed patterns, those monomers having groups endowing releasability can be copolymerized so that after a resin layer is embossed with a press stamper having a finely embossed pattern formed thereon, the resin layer is prevented from being transferred to the press stamper. Examples thereof include silicone oil (resin) having polymerizable double bonds, such as (meth)acryloyl modified silicone oil (resin), vinyl modified silicone oil (resin) etc., silicon-containing monomers such as γ-(meth)alkoxypropyl trimethoxy silane, and fluorine-containing monomers such as 2-(perfluoro-7-methyloctyl) ethyl(meth)acrylate etc.

In order to provide strength, heat resistance, resistance to wearing, water resistance and chemical resistance for the resultant optical material and flexibility and thermoplasticity for processing, the resin is particularly preferably a copolymer of monomers having a bulky structure, a cyclic structure etc., such as cyclohexyl (meth)acrylate, dicyclopentanyl (meth)acrylate, dicyclopentenyl (meth)acrylate, benzyl (meth)acrylate, styrene, α-methyl styrene, 4-vinyl pyridine, acryloyl morpholine, vinyl pyrrolidone, vinyl caprolactone etc.

Among the acrylic resin, the urethane-modified acrylic resin represented by formula 1 shown in the first aspect is particularly preferably, and a particularly preferable example is an acrylic copolymer obtained by copolymerizing 0 to 90 moles of methyl methacrylate, 0 to 80 moles of isobornyl methacrylate, 0 to 50 moles of methacrylic acid and 10 to 80 moles of 2-hydroxymethyl methacrylate.

Upon introduction of such a structure having releasability, bulky structure, cyclic structure etc. into the acrylic resin, however, the resin becomes hardly soluble in a diluting solvent for coating or poor in compatibility with urethane acrylate and polyester acrylate to be mixed for the purpose of increasing crosslinkage density or endowing flexibility, and upon formation of a resin layer, the density of the coating surface is increased. As a result, the transparency of the resin may be lost or thermal processability for formation of embossed patterns may be deteriorated. In this case, an organometallic coupling agent, particularly preferably an aluminum coupling agent is added to the photocurable resin composition in the invention, whereby the compatibility of the acrylic resin with the urethane acrylate resin and/or polyester acrylate resin having photopolymerizable functional groups is improved, and a coating surface formed from the photocurable resin composition is made smooth.

The urethane acrylate resin and/or polyester acrylate resin having photopolymerizable functional groups, which are used in combination with the acrylic resin, are added for further improving the properties of the acrylic resin, such as strength, heat resistance, resistance to wearing, water resistance and chemical resistance, for increasing crosslinkage density and for endowing photopolymerizability. Further, the urethane acrylate resin and/or polyester acrylate resin having photopolymerizable functional groups also have the effect of giving flexibility for processing to the photocurable resin composition.

Any urethane acrylate having urethane linkages and photopolymerizable (meth)acryloyl groups in its molecule can be used. Any polyester acrylate having ester linkages and photopolymerizable (meth)acryloyl groups in its molecule can be used. As the urethane acrylate and polyester acrylate, those used in the first aspect can be used in an analogous manner.

The urethane-modified acrylic resin, urethane acrylate resin and polyester acrylate resin after curing are excellent in transparency, strength, resistance to wearing, heat resistance, water resistance, chemical resistance, adhesion to the substrate, flexibility and fitting to the flex, expansion and contraction of the substrate, have sufficient abilities in film-forming property, plasticity and creep characteristics enough to form a film and endow it with an embossed pattern by a stamper and can thus be preferably used in the third aspect of the invention.

The preferable range of the molecular weight of the binder resin (E) used in the third aspect is the same as in the first aspect. That is, a part of the binder resin (E) is preferably a polymer component whose polystyrene conversion molecular weight is in the range of 2,000 to 600,000, and preferably the binder resin having a molecular weight in this range accounts for at least 20% by weight of the whole binder resin.

Like the first aspect, another binder resin having a molecular weight outside of the above range may also be added to the essential binder resin in the third aspect. A binder resin having a polystyrene conversion molecular weight of less than 2,000 may be added if necessary for the purpose of reducing the softening initiation temperature of the resin, but in consideration of prevention of surface tack and blocking occurring in the roll stock, the amount of such resin is preferably not higher than 80% by weight of the whole binder resin.

(Organometallic Coupling Agent)

The organometallic coupling agent used in the present invention is added to prevent blocking of a roll stock prepared by forming a layer of the photocurable resin and rolling it.

When the organometallic coupling agent is not contained in the photocurable resin composition, a sheet formed by applying a mixed resin of the alkali resin and the photopolymerizable urethane acrylate and/or polyester acrylate onto a support is liable to blocking because of adhesion upon being piled or rolled as a roll stock, but because the photocurable resin composition in the third aspect contains the organometallic coupling agent, blocking can be prevented.

In the present invention, the organometallic coupling agent can have the action of preventing blocking possibly because the organometallic coupling agent interacts with the binder resin, and the organometallic coupling agent acts as a binding component to permit a low-molecular-weight oligomer component to be bound to a polymer component having a high-molecular-weight chain thereby preventing the oligomer component from being eluted at a low-temperature environment.

The organometallic coupling agent is added to lower the softening initiation temperature of the photocurable resin composition and to achieve a high speed of forming finely embossed patterns. In the third aspect too, the reduction in the softening initiation temperature is desirably 2° C. or more for the same reason as in the second aspect.

Further, the organometallic coupling agent is added to smooth the surface of a resin layer formed by applying the photocurable resin composition onto a support such as a substrate film, thus achieving a high speed of forming finely embossed patterns. The effect of smoothing the surface of the coating before formation of finely embossed patterns is attributable to improvement of the compatibility of resin poor in compatibility by the organometallic coupling agent, to prevent unevenness of the coating.

The amount of the organometallic coupling agent is desirably 0.1 to 20% by weight relative to the total solids content of the photocurable resin composition. When the content of the organometallic coupling agent is less than 0.1% by weight, the effect of preventing blocking may be insufficient. On the other hand, when the content of the organometallic coupling agent is greater than 20% by weight, the shelf stability of the photocurable resin composition and a roll stock having a layer of the photocurable resin formed thereon is deteriorated.

The organometallic coupling agent includes a silane coupling agent, a titanium coupling agent, a zirconium coupling agent, an aluminum coupling agent etc., and the aluminum coupling agent is particularly excellent in the effect of smoothing the surface of the coating.

For a material forming a smooth coating surface having a Ra value of 1 nm or less, the smoothing effect of the organometallic coupling agent is considerably low. However, when an aluminum coupling agent having an alkoxy group is added, a higher effect of making the surface smooth is confirmed. This effect appears significantly when the acrylic resin and urethane acrylate resin are combined as the binder.

By incorporating the organometallic coupling agent (F) into the photocurable resin composition, the releasability of the photocurable resin composition is improved, and when the stamper pressed against the photocurable resin layer is removed, the resin composition hardly adheres to the internal surface of the cavity of the stamper so that after the stamper is removed before curing from an intermediate laminate comprising a layer of the photocurable resin composition in the third aspect formed on a flexible support such as a substrate film, the intermediate laminate can be exposed to light. Accordingly, when this photocurable resin composition is used, a high speed of forming finely embossed patterns can be achieved, and further the same effect achieved by exposure to light after removal of the stamper in the first aspect can also be obtained in the third aspect.

Further, by blending the organometallic coupling agent (F) with the photocurable resin composition, a finely embossed pattern formed by subjecting a layer of the photocurable resin composition to embossing and curing by irradiation with light is endowed with heat resistance and durability. The cured resin layer is improved in adhesion to its adjacent laminated layer by the organometallic coupling agent (F), for example, adhesion to a metal-deposited layer is improved in a transfer sheet for formation of a relief hologram, thereby improving transferability.

As the organometallic coupling agents, those exemplified in the first aspect, for example silane coupling agents such as vinyl silane etc., titanium coupling agents such as isopropyl triisostearoyl titanate etc., zirconium coupling agents such as tetra-n-propoxy zirconium etc., aluminum coupling agents such as aluminum isopropylate etc. can also be used in the third aspect.

Among the aluminum coupling agent, the one having an alkoxy group is particularly superior in the effect of smoothing the surface of the coating. However, the alkoxy group is rich in reactivity and lowers the stability of the composition, so some alkoxy groups bound to one molecule are preferably chelated.

(Other Components)

Like the photocurable resin composition in the first aspect, the photocurable resin composition in the third aspect may comprise other components such as a non-polymerizable transfer resin, a monomer and/or an oligomer, a release agent, a photopolymerization initiator, a polymerization inhibitor and a solvent as necessary.

The monomer or oligomer in the third aspect of the invention is incorporated in a ratio of preferably 5 to 50% by weight particularly preferably 5 to 30% by weight of the total solids content of the photocurable resin composition.

(Method, Sheet and Transfer Sheet for Formation of Finely Embossed Patterns)

Like the photocurable resin composition in the first aspect, the photocurable resin composition in the third aspect can also be used preferably as a material forming finely embossed patterns, particularly a material forming finely embossed patterns on optical articles. That is, the photocurable resin composition in the third aspect is applied onto the surface of a support such as a substrate film, dried if necessary to form a layer of the finely embossed pattern-forming material (finely embossed pattern-forming layer) to prepare an embossed pattern receptor, subjected to embossing by pressing a stamper onto the surface of the finely embossed pattern-forming layer of the embossed pattern receptor, to endow a finely embossed pattern thereon, and thereafter the finely embossed pattern-forming layer is cured by exposure to light, whereby the finely embossed pattern can be formed.

Further, the photocurable resin composition in the third aspect is used to prepare a finely embossed pattern-forming sheet and a finely embossed pattern transfer sheet in the same manner as for the photocurable resin composition in the first aspect, and these can be utilized to form finely embossed patterns.

In the method described above, the photocurable resin composition is applied onto the surface of a support such as a substrate film etc. to form a layer of the photocurable resin composition, and then the surface of the photocurable resin layer is subjected almost simultaneously to embossing and exposure to light, whereby the cured resin layer having the finely embossed pattern formed thereon can be produced, or the photocurable resin composition is applied onto the surface of a support such as a substrate film etc., to form a layer of the photocurable resin composition, and the surface of the photocurable resin layer is subjected to embossing, and after the stamper is removed, the surface of the layer is exposed to light, whereby the cured resin layer having the finely embossed pattern formed thereon can be produced.

Further, the finely embossed pattern-forming sheet in the third aspect is also superior in resistance to blocking, and thus the finely embossed pattern-forming sheet stored previously in the state of a roll stock is unrolled from the roll stock and subjected to embossing and light exposure almost simultaneously, or after the stamper used in embossing is removed, the sheet is exposed to light, whereby the cured resin layer having the finely embossed pattern formed thereon can be produced.

In particular, when an optical article is produced, the photocurable resin composition is applied onto the surface of a support such as a substrate film etc. to form a finely embossed pattern-forming layer, and then the surface of this layer is subjected simultaneously to embossing and exposure to radiations such as UV rays, or subjected to embossing and then to light exposure after removal of the stamper, whereby the embossed pattern-forming layer is cured, and then a metal-deposited layer or a layer having refractive index different from that of the finely embossed pattern-forming layer is laminated on the surface having the finely embossed pattern formed thereon, whereby an optical article can be obtained.

According to the third aspect of the invention, the organometallic coupling agent (F) is incorporated into the binder resin containing acrylic resin and urethane acrylate resin and/or polyester acrylate resin having photopolymerizable functional groups (E) thereby lowering the softening initiation temperature of the photocurable resin composition and improving releasability and resistance to blocking, and therefore the accurate finely embossed pattern can be mass-produced rapidly and successively at a relatively low temperature.

(Optical Article and Stamper)

When the photocurable resin composition in the third aspect is used, an optical article provided with a cured resin layer which is made of a cured product of the photocurable resin composition and has a surface structure with finely embossed patterns having various optical functions, particularly complicate and finely embossed patterns having higher optical functions than conventional can be accurately and successively mass-produced, similarly to the first aspect.

Further, when the photocurable resin composition in the third aspect is used, a stamper for reproducing a finely embossed pattern on an optical article can be produced similarly to the first aspect.

As described above, the organometallic coupling agent is incorporated into the photocurable resin composition in the third aspect of the invention, and thus the composition achieves a reduction in tack and is excellent in releasability upon release from the stamper and resistance to blocking upon piling or rolling.

Further, the photocurable resin composition in the third aspect is excellent in low-temperature processability because of its lower softening initiation temperature attributable to the action of the organometallic coupling agent. Further, the organometallic coupling agent is incorporated into the photocurable resin composition thereby attaining the effect of smoothing the surface of a layer of the photocurable resin composition.

According to the actions of the organometallic coupling agent, the photocurable resin composition in the third aspect can form accurate and finely embossed patterns by embossing even in a relatively short time at relatively low temperature.

When the photocurable resin composition in the third aspect is used, the reproducing speed is increased possibly because the organometallic coupling agent is contained in the photocurable resin composition thereby smoothing the surface of a layer of the photocurable resin composition formed on a support thus making consistency uniform to permit the stamper to be easily applied thereto and because the photocurable resin composition containing the organometallic coupling agent lowers its softening initiation temperature thus achieving a high speed of reproducing the finely embossed pattern. Further, the softening initiation temperature is lowered by incorporating the organometallic coupling agent into the photocurable resin composition so that by heating and pressing a stamper of an emboss roller etc., the finely embossed pattern on the stamper can be reproduced easily and accurately at a relatively low temperature.

Further, the finely embossed patterns on optical articles etc. can be successively mass-produced by achieving a high speed of reproducing finely embossed patterns and improving the releasability and resistance to blocking upon release from the stamper.

Further, the cured resin layer obtained by applying the photocurable resin composition in the third aspect onto a support, providing it with a finely embossed pattern and exposing it to light has improved heat resistance, durability and adhesion to its adjacent layer (particularly a metal-deposited layer) by the action of the organometallic coupling agent, to improve transferability.

Hereinafter, Examples III series in the third aspect of the invention are described.

EXAMPLE III SERIES

Example III-1

(1) Synthesis of Acrylic Resin

A 2 L four-necked flask equipped with a condenser, a dropping funnel and a thermometer was charged with 40 g toluene and 40 g methyl ethyl ketone together with an azo-type initiator, and the reaction was carried out at a temperature of 100 to 110° C. for 8 hours while adding dropwise a mixture liquid of 20.8 g 2-hydroxyethyl methacrylate, 39.0 g methyl methacrylate, 45.0 g isobornyl methacrylate, 20 g toluene and 20 g methyl ethyl ketone through the dropping funnel over about 2 hours, and then cooling to room temperature. The solids content of the resultant resin solution was 45.0% by weight, and the polystyrene conversion weight average molecular weight was 26000.

(2) Preparation of Photocurable Resin Compositions

For compositions A and B, the following ingredients were prepared.

<Ingredients in Composition A>

Resin solution obtained in "(1) Synthesis of acrylic resin" described above (solids content basis): 75 parts by weight Multifunctional urethane acrylate (SHIKOHUV-1700B (tradename), produced by The Nippon Synthetic Chemical Industry, Co., Ltd.): 25 parts by weight Trimethyl siloxy silicic acid-containing methyl polysiloxane (X-21-5766 (trade name), produced by Shin-Etsu Chemical Co., Ltd.): 1 part by weight Photopolymerization initiator (Irgacure 907 (trade name), produced by Ciba Specialty Chemicals K. K.): 4 parts by weight <Ingredients in Composition B>

Resin solution obtained in "(1) Synthesis of acrylic resin" described above (solids content basis): 70 parts by weight Multifunctional urethane acrylate (SHIKOHUV-1700B (trade name), produced by The Nippon Synthetic Chemical Industry, Co., Ltd.): 30 parts by weight Trimethyl siloxy silicic acid-containing methyl polysiloxane (X-21-5766 (trade name), produced by Shin-Etsu Chemical Co., Ltd.): 1 part by weight Photopolymerization initiator (Irgacure 907 (trade name), produced by Ciba Specialty Chemicals K.K.): 4 parts by weight <Preparation of Photocurable Resin Compositions A-1 and B-1>

The solids contents of compositions A and B (i.e. the compositions to which an aluminum coupling agent was not added) were adjusted to 20% by weight with methyl ethyl ketone, to give the photocurable resin composition A-1 and B-1 respectively.

<Preparation of Photocurable Resin Compositions A-2 and B-2>

An aluminum chelate (S-75P (trade name), from Kawaken Fine Chemical) was added to the above compositions A and B at 5% by weight on a solids-content basis, and the solids content of each of the whole compositions was adjusted to 20% by weight with methyl ethyl ketone, to give the photocurable resin compositions A-2 and B-2, respectively.

<Preparation of Photocurable Resin Compositions A-3 and B-3>

An aluminum chelate (ALCH-TR (trade name), from Kawaken Fine Chemical) was added to the above compositions A and B at 5% by weight on a solids-content basis, and the solids content of each of the whole compositions was adjusted to 20% by weight with methyl ethyl ketone, to give the photocurable resin compositions A-3 and B-3, respectively.

(3) Preparation of Reproducing Films

Each photocurable resin composition prepared in the above processes was applied by a bar coater onto an adhesion-facilitated surface of a polyethylene terephthalate film of 50 µm in thickness, one surface of which is treated to facilitate adhesion (Lumiral 50T85S (trade name) from Toray Industries, Inc.) and dried at 100° C. such that the thickness of the film after drying was 2 g/m², to give reproducing films A-1, A-2, A-3, B-1, B-2 and B-3. Each of the resulting reproducing films was not sticky at ordinary temperature.

(5) Blocking Test

Each of the reproducing films A-1, A-2, A-3, B-1, B-2 and B-3 prepared in the above processes was subjected to loading at 5 kg/cm² on a blocking tester, and then kept for 24 hours in an environment at 30° C. Then, each reproducing film was taken, and the roughness of the film surface was confirmed. A film having a transparent, unchanged surface was evaluated as ○, a film which was opaque in the portion subjected to loading as ∆, and a film confirmed to have traces on the front side in which resin was dissolved at a portion subjected to loading or to have roughness even at a portion not subjected to loading as x.

From Table 7, it is recognized that the compositions to which the aluminum coupling agent was added have the effect of preventing blocking.

(5) Measurement of the Softening Initiation Temperatures of the Photocurable Resin Compositions The photocurable resin compositions B-1, B-2, B-3, B-4 and B-5 prepared in process 2 above were softened once by heating at 60° C. and then set in a measuring jig in a dynamic viscoelasticity measuring device. As described above, the measurement conditions were set such that the basic measurement frequency was 10 Hz, the distortion waveform was a sine wave, the distortion regulation was 0.5 µm, the temperature range was from room temperature to 150° C., and the increasing temperature was 3° C./min. The softening initiation temperatures thus determined are shown in Table 7 below.

(6) Observation of the Surface of the Film of the Resin Sheet

The reproducing films A-1, A-2, A-3, B-1, B-2 and B-3 obtained in "3. Preparation of reproducing films" were measured for the surface roughness of the resin layer by tapping-mode in AFM (atomic force microscopy). The measurement device used in this measurement is Nano Scope IIIa type from Digital Instruments Ltd., and measurement was carried out in a tapping mode. The surface roughness average Ra of the embossed pattern in the depth direction was determined in the scanning range of 10 µm×10 µm at a scanning rate of 0.5 Hz.

Figure 3:
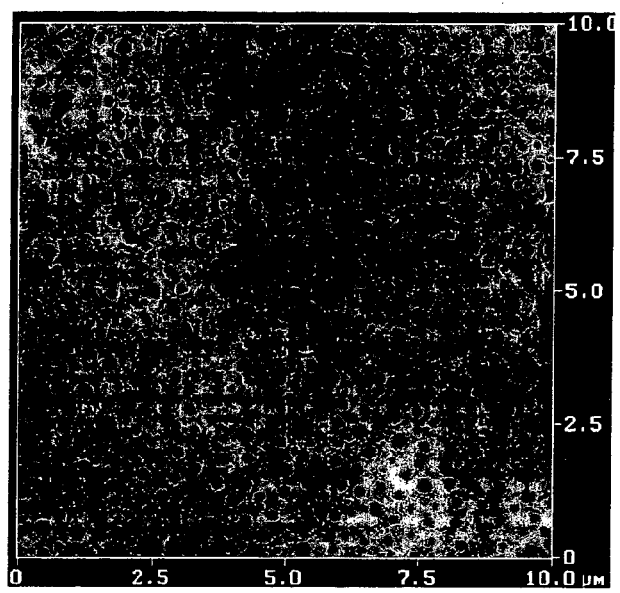
FIG. 3 is a photograph of an AFM image (atomic force microscopy) of the reproducing film A-1 prepared in Example III-1.
Figure 4:
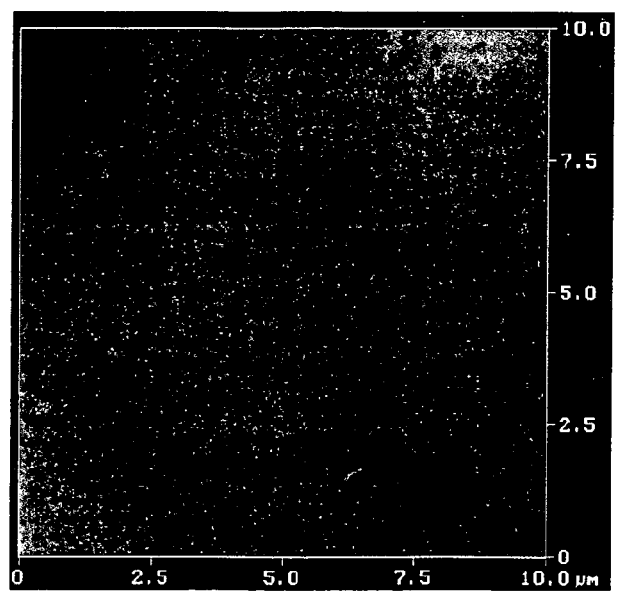
FIG. 4 is a photograph of an AFM image (atomic force microscopy) of the reproducing film A-2 prepared in Example III-1.
Figure 5:
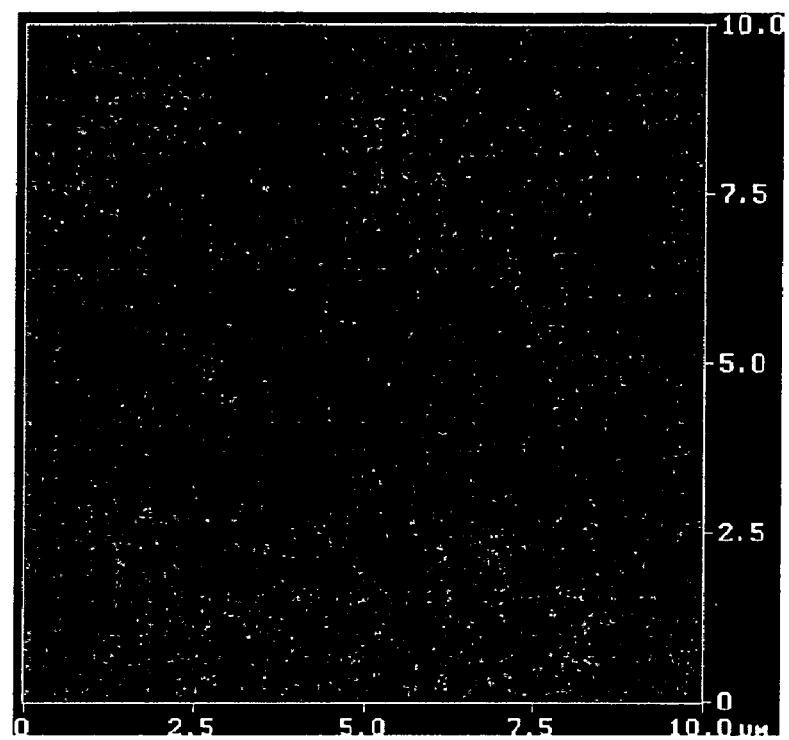
FIG. 5 is a photograph of an AFM image (atomic force microscopy) of the reproducing film A-3 prepared in Example III-1.

FIG. 3 shows a photograph of an AFM image of the reproducing film A-1; FIG. 4 shows a photograph of an AFM image of the reproducing film A-2; and FIG. 5 shows a photograph of an AFM image of the reproducing film A-3. The reproducing film A-1 to which the organometallic coupling agent was not added showed a Ra of 5.904 nm, while the reproducing films A-2 and A-3 to which the organometallic coupling agent was added in an amount of 5% by weight on a solids content basis showed a Ra of 0.335 nm regarding the A-2 and a Ra of 1.304 nm regarding the A-3 respectively.

From these results, it is recognized that the organometallic coupling agent added has the effect of improving the compatibility between the resins or between the resin and the organic solvent to form a uniform film surface.

(7) Preparation of Finely Embossed Pattern Sheets

Then, a press stamper having a finely embossed pattern formed thereon was attached to the emboss roller in the reproducing unit, and the reproducing film was set in the reproducing unit and provided with a finely embossed pattern by heat pressing. The heating conditions are the following conditions 1 to 3:

(Condition 1) While the surface temperature of the press stamper was set at 150° C., pressing was carried out at a predetermined rate.

(Condition 2) While the surface temperature of the press stamper was set at 130° C., pressing was carried out at a predetermined rate.

(Condition 3) While the surface temperature of the press stamper was set at 150° C., pressing was carried out at a rate twice as high as the rate of the above (condition 1). That is, the time of contacting the film with the press stamper was reduced by half.

After pressing, the film was removed from the press stamper and cured by irradiation with UV rays.

(7) Observation of the Shape of the Finely Embossed Pattern

The surface shape of the finely embossed pattern sheet and the height of embossed portions were evaluated by comparing tapping-mode images in AFM (atomic force microscopy). An image of the surface shape was evaluated with naked eyes, and a sheet having embossed portions of regulated shape was expressed as ○, and a sheet having round edges of embossed portions was expressed as x. As the height of embossed portions, the distance between the concave and convex portions was determined. The results of the height of embossed portions and observation of the shape are shown in Table 8 below.

Example III-2

(1) Preparation of High-Molecular Type Photocurable Resin Compositions

For compositions C and D, the following ingredients were prepared.

<Ingredients in Composition C>
Polymethyl methacrylate (BR-85 (trade name), molecular weight 280000, produced by Mitsubishi Rayon): 75 parts by weight
Multifunctional urethane acrylate (SHIKOHUV-1700B (tradename), produced by The Nippon Synthetic Chemical Industry, Co., Ltd.): 25 parts by weight
Trimethyl siloxy silicic acid-containing methyl polysiloxane (X-21-3056 (trade name), produced by Shin-Etsu Chemical Co., Ltd.): 1 part by weight
Photopolymerization initiator (Irgacure 907 (trade name), produced by Ciba Specialty Chemicals K.K.): 5 parts by weight <Ingredients in Composition D>
Polymethyl methacrylate (BR-88 (trade name), molecular weight 480000, produced by Mitsubishi Rayon): 70 parts by weight
Multifunctional urethane acrylate (SHIKOHUV-1700B (tradename), produced by The Nippon Synthetic Chemical Industry, Co., Ltd.): 30 parts by weight
Trimethyl siloxy silicic acid-containing methyl polysiloxane (X-21-3056 (trade name), produced by Shin-Etsu Chemical Co., Ltd.): 1 part by weight
Photopolymerization initiator (Irgacure 907 (trade name), produced by Ciba Specialty Chemicals K.K.): 5 parts by weight <Preparation of Photocurable Resin Compositions C-1 and D-1>

The solids content of compositions C and D (that is, the compositions to which an aluminum coupling agent was not added) was adjusted to 10% by weight with methyl ethyl ketone, to give the photocurable resin compositions C-1 and D-1 respectively.

<Preparation of Photocurable Resin Compositions C-2 and D-2>

An aluminum chelate (S-75P (trade name) having partially chelated alkoxy groups, from Kawaken Fine Chemical) was added to the above described compositions C and D at 5% by weight on a solids-content basis, and the solids content of the whole compositions was adjusted to 10% by weight with methyl ethyl ketone, to give photocurable resin compositions C-2 and D-2.

<Preparation of Photocurable Resin Compositions C-3 and D-3>

An aluminum chelate (ALCH-TR (trade name) having partially chelated alkoxy groups, from Kawaken Fine Chemical) was added to the above described compositions C and D at 5% by weight on a solids-content basis, and the solids content of the whole compositions was adjusted to 10% by weight with methyl ethyl ketone, to give photocurable resin compositions C-3 and D-3.

(2) Preparation of Reproducing Films

The reproducing films C-1, C-2, C-3, D-1, D-2 and D-3 were obtained in the same manner as in Example III-1 (3).

(3) Blocking Test

The reproducing films C-1, C-2, C-3, D-1, D-2 and D-3 were examined in a blocking test in the same manner as in Example III-1 (4). The results are shown in Table 7 below.

(4) Measurement of the Softening Initiation Temperatures of the Photocurable Resin Compositions The reproducing films C-1, C-2, C-3, D-1, D-2 and D-3 were measured for their softening initiation temperature in the same manner as in Example III-1 (5). The results are shown in Table 7 below.

As can be seen from Table 7, the glass transition temperature after curing is increased by adding the aluminum coupling agent. It can also be seen that transferability is improved by adding the aluminum coupling agent.

(5) Observation of the Film Surface of the Resin Sheet

The reproducing films C-1, C-2, C-3, D-1, D-2 and D-3 were observed for their film surface in the same manner as in Example III-1 (6).

As a result, the reproducing film C-1 to which the organometallic coupling agent was not added showed a Ra of 0.521 nm, while the reproducing film C-2 to which the organometallic coupling agent was added in an amount of 5% by weight on a solids content basis showed a Ra of 0.391 nm. Further, the reproducing film D-1 to which the organometallic coupling agent was not added showed a Ra of 0.620 nm, while the reproducing film D-2 to which the organometallic coupling agent was added in an amount of 5% by weight on a solids content basis showed a Ra of 0.427 nm.

(6) Preparation of Finely Embossed Pattern Sheets

From the reproducing films C-1, C-2, C-3, D-1, D-2 and D-3, finely embossed pattern sheets were prepared in the same manner as in Example III-1 (7).

(7) Observation of the Shape of Finely Embossed Patterns

The finely embossed pattern sheets prepared in Example III-2 (6) were observed for their finely embossed pattern in the same manner as in Example III-1 (8). The results are shown in Table 8 below.

(7) Observation of the Shape of Finely Embossed Patterns

The surface shape of the finely embossed pattern sheet and the height of embossed portions were evaluated by comparing tapping-mode images in AFM (atomic force microscopy). An image of the surface shape was evaluated with naked eyes, and a sheet having embossed portions of regulated shape was expressed as ○, and a sheet having round edges of embossed portions was expressed as x. As the height of embossed portions, the distance between the concave and convex portions was determined. The results of the height of embossed portions and observation of the shape are shown in Table 8 below.

TABLE 7

|  | Blocking | Measurement of softening temperature | Glass after curing | Transferability |
| --- | --- | --- | --- | --- |
| A-1 | Δ | 53° C. | 125.5° C. | Δ |
| A-2 | ○ | 49° C. | 130.0° C. | ○ |
| A-3 | ○ | 48° C. | 126.6° C. | ○ |
| B-1 | X | 45° C. | 144.0° C. | X |
| B-2 | ○ | 42° C. | 149.8° C. | ○ |
| B-3 | ○ | 40° C. | 146.2° C. | ○ |
| C-1 | Δ | 56° C. | 90.0° C. | Δ |
| C-2 | ○ | 53° C. | 99.3° C. | ○ |
| C-3 | ○ | 51° C. | 92.3° C. | ○ |
| D-1 | X | 48° C. | 101.1° C. | X |
| D-2 | ○ | 45° C. | 106.0° C. | ○ |
| D-3 | Δ | 45° C. | 103.2° C. | ○ |

TABLE 8

| | Height of Embossed Portions (nm) | | | Evaluation Items (Visual Observation) | | |
|---|---|---|---|---|---|---|
| | Condition 1 | Condition 2 | Condition 3 | Condition 1 | Condition 2 | Condition 3 |
| A-1 | 88 | 60 | 43 | ○ | X | X |
| A-2 | 87 | 86 | 86 | ○ | ○ | ○ |
| A-3 | 89 | 74 | 71 | ○ | ○ | ○ |
| B-1 | 84 | 85 | 87 | ○ | ○ | ○ |
| B-2 | 84 | 88 | 81 | ○ | ○ | ○ |
| B-3 | 82 | 81 | 74 | ○ | ○ | ○ |
| C-1 | 89 | 64 | 62 | ○ | X | X |
| C-2 | 91 | 88 | 90 | ◎ | ◎ | ○ |
| C-3 | 87 | 87 | 88 | ◎ | ○ | ○ |
| D-1 | 84 | 78 | 61 | ○ | ○ | X |
| D-2 | 89 | 88 | 89 | ◎ | ◎ | ○ |
| D-3 | 92 | 86 | 90 | ◎ | ○ | ○ |

What is claimed is:

1. A photocurable resin composition comprising, as essential components, (A) a binder resin having photopolymerizable functional groups, wherein the binder resin (A) contains at least one member selected from the group consisting of urethane-modified acrylic resin, urethane acrylate resin and polyester acrylate resin and the polystyrene conversion molecular weight of the binder resin (A) is in the range of 2,000 to 600,000, and (B) inorganic superfine particles having a thickness of 1 to 100 nm, a length of 10 to 500 nm and an aspect ratio of 3 or more which can be dispersed in a colloidal form in a diluting solvent for preparation of a coating liquid.

2. The photocurable resin composition according to claim 1, wherein the content of the inorganic superfine particles (B) is in the range of 0.1 to 70% by weight relative to the total solids content.

3. The photocurable resin composition according to claim 1, wherein the inorganic superfine particles (B) are inorganic superfine particles having a surface rendered compatible with solvent.

4. The photocurable resin composition according to claim 1, which further comprises a monomer or oligomer having photopolymerizable functional groups.

5. The photocurable resin composition according to claim 1, which further comprises a releasing agent.

6. The photocurable resin composition according to claim 1, which further comprises an organometallic coupling agent.

7. The photocurable resin composition according to claim 1, which is used for formation of a finely embossed pattern on an optical article.

* * * * *